(12) United States Patent
Endo et al.

(10) Patent No.: US 10,445,037 B2
(45) Date of Patent: Oct. 15, 2019

(54) IMAGE PROCESSING APPARATUS AND STORAGE MEDIUM

(71) Applicant: FUJI XEROX CO., LTD., Tokyo (JP)

(72) Inventors: Yasuhiro Endo, Kanagawa (JP); Masanori Satake, Kanagawa (JP); Masao Morita, Kanagawa (JP); Tadao Michimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 128 days.

(21) Appl. No.: 15/608,014

(22) Filed: May 30, 2017

(65) Prior Publication Data

US 2018/0088878 A1 Mar. 29, 2018

(30) Foreign Application Priority Data

Sep. 26, 2016 (JP) .................................. 2016-187292
Mar. 10, 2017 (JP) .................................. 2017-046673

(51) Int. Cl.
*G06F 3/12* (2006.01)
*G06F 8/71* (2018.01)
*G06F 9/445* (2018.01)
*G06F 3/048* (2013.01)
*G06T 1/20* (2006.01)
*G06F 9/46* (2006.01)
*H04N 1/00* (2006.01)
*G06F 3/0488* (2013.01)
*G06F 3/0482* (2013.01)
*G06F 3/0354* (2013.01)

(52) U.S. Cl.
CPC ............ *G06F 3/1237* (2013.01); *G06F 3/048* (2013.01); *G06F 8/71* (2013.01); *G06F 9/44505* (2013.01); *G06F 9/46* (2013.01); *G06T 1/20* (2013.01); *H04N 1/0035* (2013.01); *G06F 3/03547* (2013.01); *G06F 3/0482* (2013.01); *G06F 3/0488* (2013.01); *H04N 2201/0094* (2013.01)

(58) Field of Classification Search
CPC ............................. G06F 8/71; G06F 9/44505
USPC .................................................. 717/120, 121
See application file for complete search history.

(56) References Cited

U.S. PATENT DOCUMENTS

2005/0243364 A1* 11/2005 Sakai ..................... G06F 21/608
358/1.15
2007/0223473 A1* 9/2007 Sakai .................. H04L 29/1232
370/389
2008/0168441 A1* 7/2008 Imamichi ................ G06F 9/544
718/100
2009/0237728 A1* 9/2009 Yamamoto ............ G06F 3/1454
358/1.15

(Continued)

FOREIGN PATENT DOCUMENTS

JP 2012-027662 A 2/2012
JP 2012-248102 A 12/2012

*Primary Examiner* — Phillip H Nguyen
(74) *Attorney, Agent, or Firm* — Oliff PLC

(57) ABSTRACT

An image processing apparatus includes an application on a framework that is separated into a core logic portion handling basic processing and a user interface frame portion handling rendering processing and operates; and a controller that executes the application and the framework. The core logic portion is implemented with an application programming interface defined by the framework, and publishes a method and an event that are used for communication with a core logic portion of another application.

11 Claims, 23 Drawing Sheets

(56) References Cited

U.S. PATENT DOCUMENTS

| | | | |
|---|---|---|---|
| 2009/0310183 A1* | 12/2009 | Sone | G06F 9/45512 |
| | | | 358/1.18 |
| 2012/0023451 A1 | 1/2012 | Kuroyanagi | |
| 2013/0183926 A1* | 7/2013 | Lindberg | H04W 24/00 |
| | | | 455/405 |
| 2015/0092253 A1* | 4/2015 | Kasahara | H04N 1/00997 |
| | | | 358/475 |
| 2015/0355918 A1* | 12/2015 | Ohhashi | G06F 9/455 |
| | | | 703/24 |
| 2016/0125173 A1* | 5/2016 | Ohzaki | G06F 21/10 |
| | | | 726/29 |

\* cited by examiner

FIG. 8

```
applicationInfoList : [
{
    "base" :
       {
           "id" : "appId.std.copy",
           "url" : "app/copy/baseframe.html"
       },
    "apps" : [
       {
           "subId" : "copy",
           "type" : "STD",
           "appUrl" : "app/copy/copy/uiframe.html",
           "isLaunchable" : true,
           "orderWeight" : 100,
           "largeIcon" : "common/img/preset/apps/app_copy_120.png",
           "smallIcon": "common/img/preset/apps/app_copy_48.png",
           "author" : "Fuji Xerox Co.,Ltd.",
           "description" : "Standard Copy Application",
           "displayName" : "COPY",
           "displayNameId" : "001"
       },
       {
           "subId" : "idcopy",
           "type" : "STD",
           "appUrl" : "app/copy/idcopy/uiframe.html",
           "isLaunchable" : true,
           "orderWeight" : 1300,
           "largeIcon" : "common/img/preset/apps/app_idcardcopy_120.png",
           "smallIcon" : "common/img/preset/apps/app_idcardcopy_48.png",
           "author" : "Fuji Xerox Co.,Ltd.",
           "description" : "ID Card Copy Application",
           "displayName" : "IDCOPY",
           "displayNameId" : "002"
       }
    ]
}
]
```

FIG. 10A

```
App/
    common/
        comlib1
        comlib2
    copy/
        baseframe.html
        base_manifest.json
        copy/
            uiframe.html
            app_manifest.json
        idcopy/
            uiframe.html
            app_manifest.json
```

FIG. 10B

```
App/
    common/
        comlib1
        comlib2
    copy/
        baseframe.html
        base_manifest.json
        copy/
            uiframe.html
            app_manifest.json
        idcopy_for_xxx
            uiframe.html
            app_manifest.json
```

FIG. 10C

```
App/
    common/
        comlib1
        comlib2
    copy_for_xxx/
        baseframe.html
        base_manifest.json
        copy/
            uiframe.html
            app_manifest.json
        idcopy
            uiframe.html
            app_manifest.json
```

FIG. 18

```
{
"type" : "EXT",
"subId" : "CUIAPP_1",
"isLaunchable" : true,
"appUrl" :
"http://localhost/cs/CUIAPP_1/CopyWeblet/CopyWeblet.
html",
"largeIcon" : "",
"smallIcon" :
"http://localhost/cs/CUIAPP_1/CopyWeblet/CopyWeblet.
png",
"toolsIcon" :
"http://localhost/cs/CUIAPP_1/CopyWeblet/tools.png",
"displayName" : "CopyWeblet",
"installDateTime" : 1473419873,
"author" : "Xerox",
"description" : "Copy Weblet",
"isNativeEXT" : false,
"descriptionUrl" :
"http://localhost/cs/CUIAPP_1/CopyWeblet/description
.xml",
"extAppType" : "SERVICE",
"isDisabledEXT" : false,
"browserTypeEXT" : "secondGen"
}
```

IMAGE PROCESSING APPARATUS AND STORAGE MEDIUM

CROSS-REFERENCE TO RELATED APPLICATIONS

This application is based on and claims priority under 35 USC 119 from Japanese Patent Application No. 2016-187292 filed Sep. 26, 2016 and No. 2017-046673 filed Mar. 10, 2017.

BACKGROUND (i) Technical Field

The present invention relates to an image processing apparatus and a storage medium.

(ii) Related Art

The functions of a multifunction machine having functions, such as copy, print, and fax, are further expanded, and hence it is requested to efficiently construct the entire system including various applications.

SUMMARY

According to an aspect of the invention, there is provided an image processing apparatus including an application on a framework that is separated into a core logic portion handling basic processing and a user interface frame portion handling rendering processing and operates; and a controller that executes the application and the framework. The core logic portion is implemented with an application programming interface defined by the framework. The core logic portion publishes a method and an event that are used for communication with a core logic portion of another application.

BRIEF DESCRIPTION OF THE DRAWINGS

An exemplary embodiment of the present invention will be described in detail based on the following figures, wherein:

FIG. 8 is an explanatory view showing a specific configuration example of an application list;

FIGS. 10A to 10C are explanatory views at change of UI and logic;

FIG. 18 is an explanatory view showing manifest information on the companion application;

DETAILED DESCRIPTION

An exemplary embodiment of the present invention is described below with reference to the figures.

General System Configuration

Figure 1:
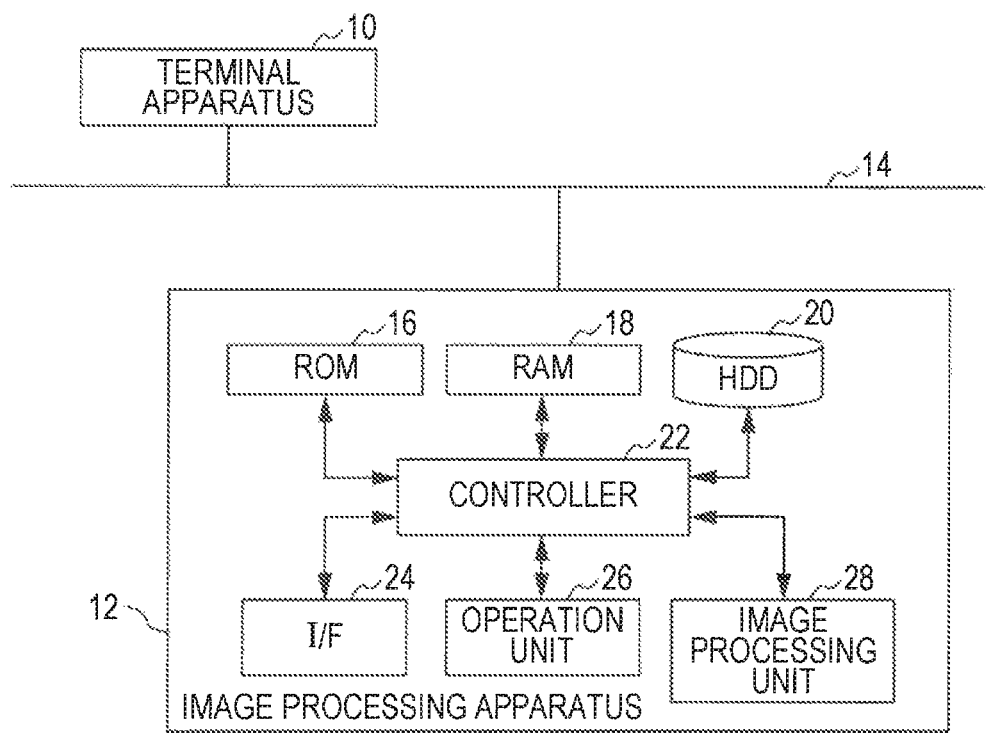
FIG. 1 is a functional block diagram of an image processing apparatus.

FIG. 1 is a configuration block diagram of an image processing system including an image processing apparatus according to this exemplary embodiment. The image processing system includes a terminal apparatus 10 and an image processing apparatus 12. The terminal apparatus 10 and the image processing apparatus 12 are connected with one another through a communication unit 14. The communication unit 14 uses, for example, a data communication network, such as a local area network (LAN).

The terminal apparatus 10 is connected with the image processing apparatus 12 through the communication unit 14, and transmits, for example, a print job including a print command of a document in accordance with an instruction of a user.

The image processing apparatus 12 includes a read-only memory (ROM) 16, a random access memory (RAM) 18, a hard disk drive (HDD) 20, a controller 22 configured of one or plural central processing units (CPUs), an input/output interface (I/F) 24, an operation unit 26 such as a touch panel, and an image processing unit 28.

The controller 22 configured of the one or plural CPUs receives, for example, a print job command from the terminal apparatus 10 through the input/output I/F 24, interprets page-description language (PDL) data and creates intermediate data, and further creates rendering data (raster data) from the created intermediate data, in accordance with a processing program stored in the ROM 16. Also, the controller 22 executes various commands, such as copy, scan, and fax, received from the operation unit 26.

The image processing unit 28 includes a print module, a scan module, a fax module, a paper feed module, a document feed module, and an image processing accelerator.

The print module has a function of outputting an image on paper. For example, the print module includes a configuration of known inkjet method, and prints rendering data on paper. The print module discharges liquid or molten solid ink from a nozzle or the like, and executes recording on paper, film, or another material. Methods of discharging ink include a drop-on-demand method of discharging ink by using electrostatic attraction force (pressure pulse method), and a thermal inkjet method of discharging ink by using a pressure generated by forming and growing air bubbles with heat at high temperature. A recording head to be used includes, for example, a head that discharges cyan ink, a head that discharges magenta ink, a head that discharges yellow ink, and a head that discharges black ink. Each head uses a line head having at least a width equivalent to the width of paper. Ink droplets of the respective colors are discharged on an intermediate transfer body by the recording head for recording, and then transferred on paper for printing.

The scan module reads an image from paper and converts the image into electronic data.

The fax module includes a modem and a fax image processing module, and executes a fax function.

The paper feed module transports paper from a paper tray to the print module.

The document feed module transports paper from a document tray to the scan module.

The image processing accelerator is a module that executes compression/expansion processing in association with, for example, the scan module. The image processing accelerator is not necessarily provided and may be an additional module.

The image processing apparatus 12 may include, in addition to the aforementioned modules, a finisher that provides, for example, punching and sorting for paper; a universal serial bus (USB); an authentication unit that is configured of an integrated circuit (IC) card reader or the like, and authenticates a user; a billing unit; and/or a human sensor, a face camera, or the like.

Also, the image processing apparatus 12 may be connected with the Internet through the communication unit 14, or may include Ethernet (registered trademark) and/or Wi-Fi (registered trademark).

Logic Configuration of Program

Figure 2:
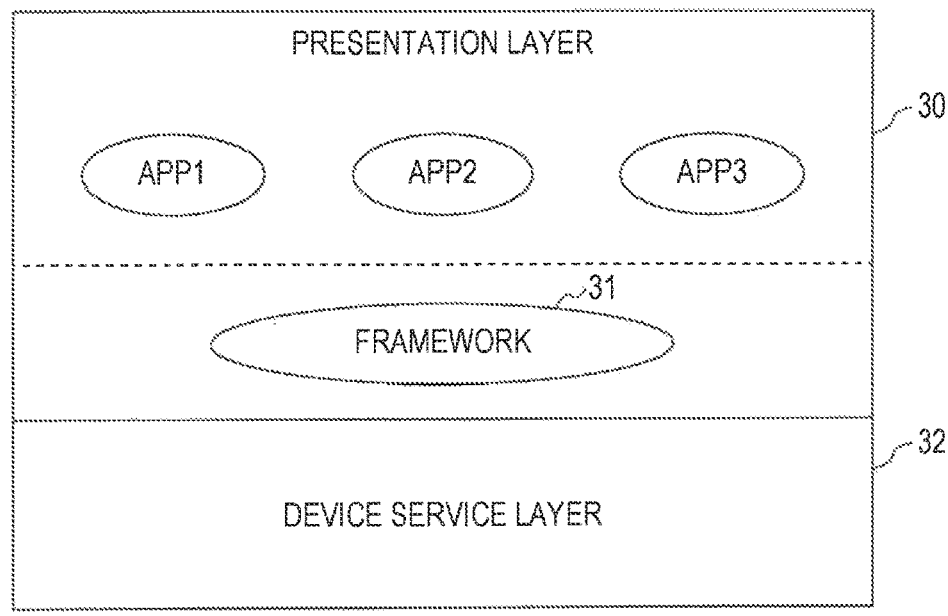
FIG. 2 is a logic configuration diagram of a system.

FIG. 2 shows a logic configuration of the system executed by the controller 22. The system is roughly separated into two layers including a presentation layer 30 and a device service layer 32.

The presentation layer 30 is a layer in which various applications are implemented, and includes a framework 31 and various applications. The framework 31 is an execution environment software group that allows JavaScript (registered trademark) applications to be operable on a computer system. To be more specific, JavaScript is executed on a web browser, and base frame and UI frame are loaded as iframe of HyperText Markup Language (HTML). Also, such an application is JavaScript software implemented with an application programming interface provided by the framework 31. The framework 31 manages the life cycles of the various applications. That is, for each of the various applications, the framework 31 creates a base frame, reads a core logic of the application, and gives an instruction of initialization to the core logic. Also, at deactivation of the system, the framework 31 gives an instruction of finalization to the core logic of each of the various applications, and deletes the base frame. The core logic and the life cycle management of each of the various applications are described later in more detail.

The device service layer 32 is a layer that manages various hardware devices. The hardware devices include, for example, the print module of the above-described image processing unit 28.

Figure 3:
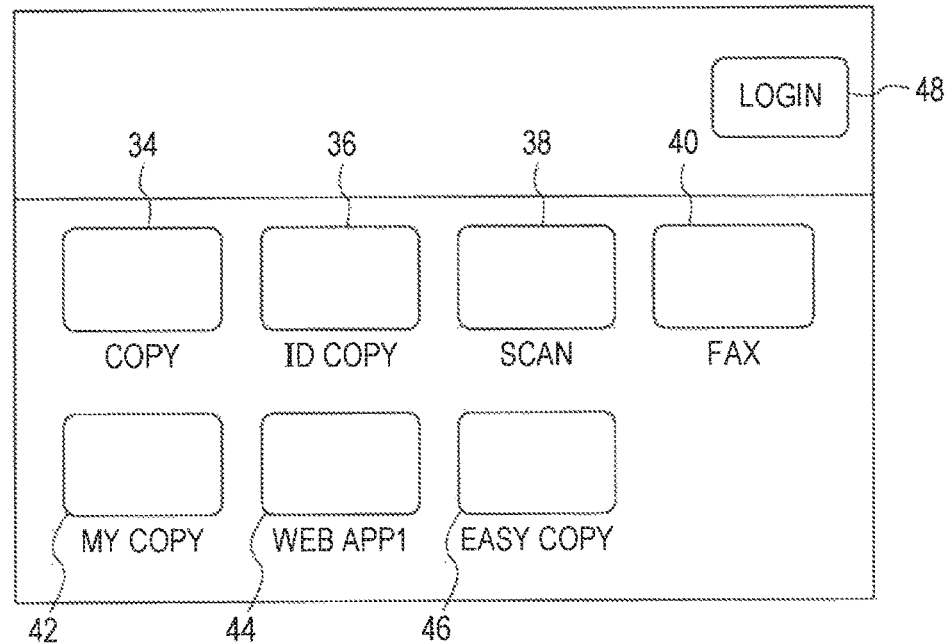
FIG. 3 is an explanatory view showing an example of a home screen.

FIG. 3 shows an example of a screen (home screen) displayed on the operation unit 26 of the image processing apparatus 12. The home screen includes icons displayed thereon. The icons include a copy button 34, an ID card copy (ID copy) button 36, a scan button 38, a fax button 40, a my copy button 42, a web application (web app1) button 44, and an easy copy button 46. When a user touches and selects one of the buttons, an application assigned to the button is activated, and the screen transitions to an application screen. The user may recognize that a button corresponds to an application.

Each application is JavaScript software that provides the application programming interface defined by the framework 31 as described above, and is a component that provides a function directly to the user. Each application has a common configuration defined by the framework 31. Also, each application is configured to have a low link degree with respect to another application. Applications include an application that operates in cooperation with the user through a user interface (UI) and an application that does not cooperate with the user. The application that cooperates with the user subjectively executes displaying and inputting through the presentation layer 30.

The figure also shows a login button 48 for the user to make login. This button also corresponds to an application.

Implementation Structure of Application

Figure 4:
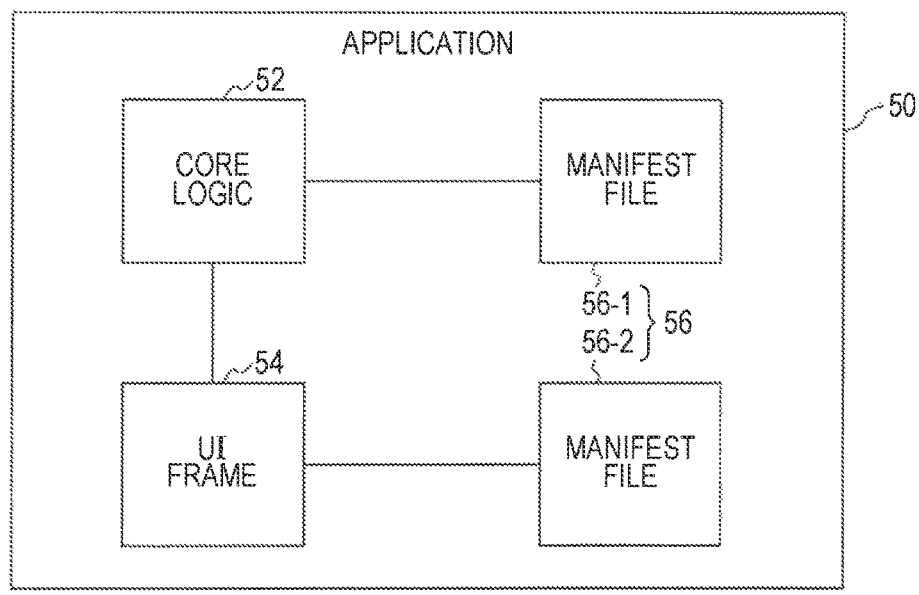
FIG. 4 is a logic configuration diagram of an application.

FIG. 4 shows a structure of an application. An application 50 is roughly separated into three components. That is, the application 50 is separated into a core logic 52, a UI frame 54, and a manifest file 56. In this case, "separation" does not represent physical separation, but represents logical separation.

The core logic 52 is a component that executes basic processing (basic behavior and inter-application association) as an application, and is necessarily present in each application. The core logic provides an application programming interface defined by the framework 31.

The UI frame 54 is a component that provides rendering and displaying as an application, or more specifically, is managed as a display window.

The manifest file 56 is a list of static information on each application. The static information may include an identifier (ID), a display name, an icon image, a version, a creation date, and so forth, of the application. The manifest file 56 includes a core logic manifest file 56-1 and a UI frame manifest file 56-2. A piece of information to be written by the manifest file 56 is isLaunchable attribute. With this attribute, it is determined whether or not the application is displayed as an icon (button) on the home screen. The attributes are as follows:

display is selected if isLaunchable=true; and
non-display is selected if isLaunchable=false.

With this configuration, communication rules between the core logic 52 and the UI frame 54 are as follows:

(1) the core logic 52 communicates with another core logic 52; and (2) the UI frame 54 communicates with only the core logic 52.

Therefore, the UI frame 54 does not communicate with another UI frame 54.

Figure 5:
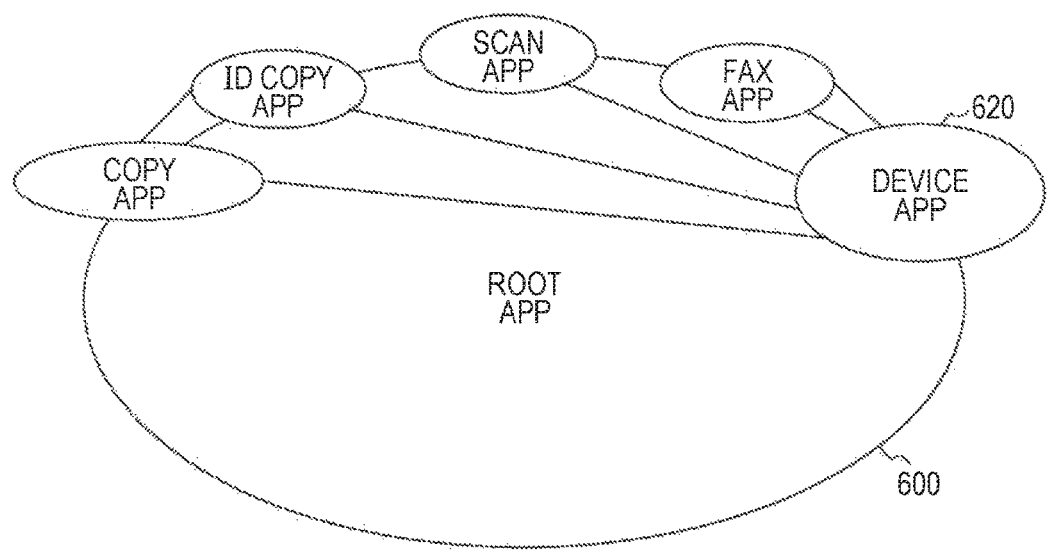
FIG. 5 is a logic configuration diagram of a system of related art.

FIG. 5 shows a program configuration of related art. In related art, a large root application (root app) 600 is prepared and various functions to be used from respective applications are provided. All the applications depend on this root application 600. Also, a device application (device app) 620 that dedicatedly handles the states of various devices is also independently present. Substantially all the applications depend on this device application 620. Further, common implementation among applications progresses, and the applications depend on one another. Hence, even in a case where an application is added or deleted, adjustment is required among the applications every time the case occurs, and the root application 600 is constantly required to be corrected. An application may not be easily added or deleted.

Figure 6:
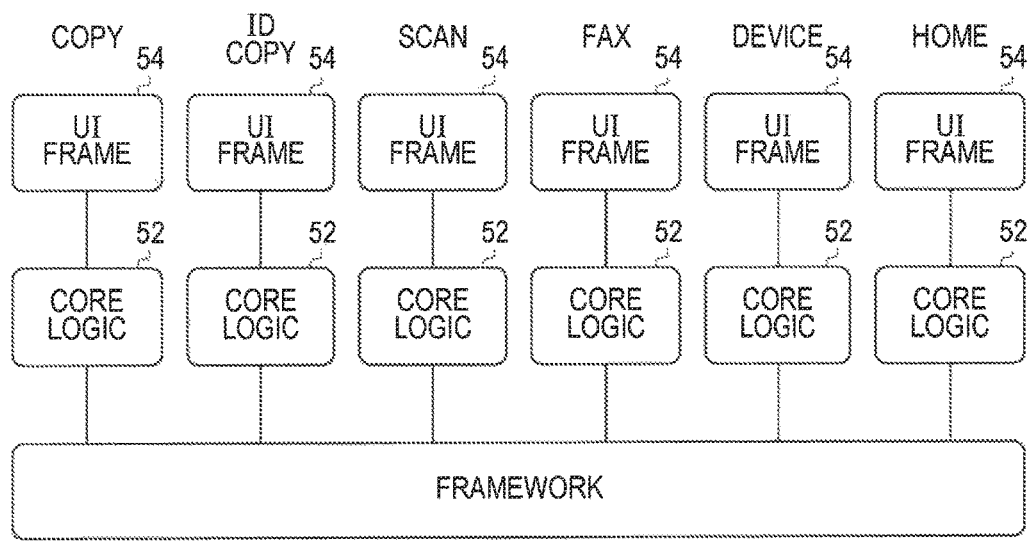
FIG. 6 is a configuration diagram of applications on a framework.

In contrast, FIG. 6 shows a program configuration of this exemplary embodiment. Each application is separated into a core logic 52, a UI frame 54, and a manifest file 56. The core logic 52 of each application is connected with a framework 31. The UI frame 54 of each application is connected with the core logic 52 of the application.

For example, exemplarily describing a copy application, the copy application is separated into a core logic 52, a UI frame 54, and a manifest file 56. The core logic 52 is connected with the framework 31. The UI frame 54 is connected with the core logic 52. Link among respective applications is limited without dependence unlike related art, and hence association among the applications is executed by the framework 31 through the core logics 52. The core logic 52 of each application provides an application programming interface defined by the framework 31. Hence, when an application is newly added, the addition may be easily executed by providing the application programming interface defined by the framework 31. Also, since the link among the applications is limited, an application may be easily deleted.

Figure 7:
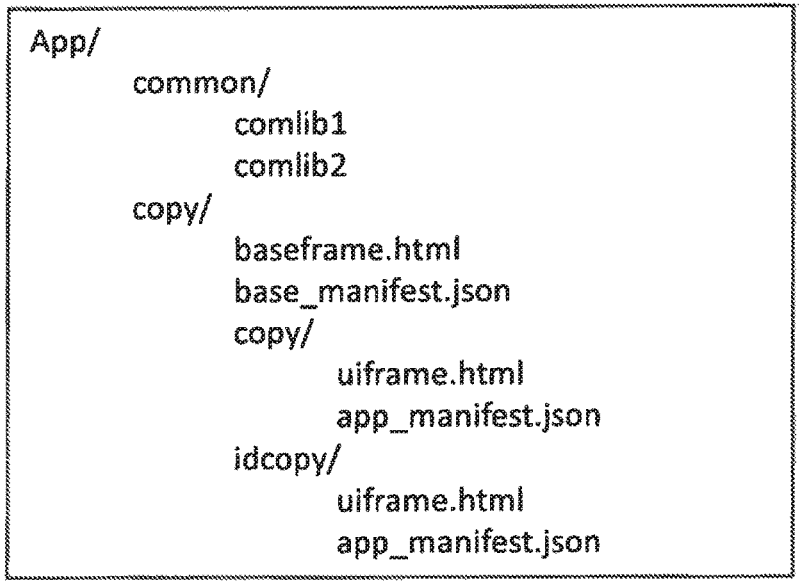
FIG. 7 is an explanatory view showing a specific configuration example of an application.

FIG. 7 shows an example of the copy application. In the figure, baseframe.html is a core logic 52, and base_manifest.json is a manifest file 56-1 of the core logic 52. Also, uiframe.html is a UI frame 54, and app_manifest.json is a manifest file 56-2 of the UI frame 54.

FIG. 8 shows an example of an application list. In the figure, "base" represents a manifest file 56-1 of a core logic 52, and "app" represents a manifest file 56-2 of a UI frame 54. In the manifest file 56-2, "type" represents the type of an application. The types of applications are as follows.

In particular, applications include four types.
  STD: an application preinstalled
  OT: a shortcut of the application preinstalled (STD)
  EXT: an application that may be added (type I application)
  CS: an application that may be added (type II application)
Applications preinstalled are applications corresponding to copy, scan, fax, and so forth, shown in FIG. 3. Also, each application of OT, EXT, and CS is assigned with a special companion application. Each companion application handles a corresponding function. Each companion application also includes a core logic 52 similarly to the STD application. Since the manifest file 56 includes the type of an application, the internal implementation of each application may be discriminated from that of another application.

Also, "isLaunchable" in the manifest file 56-2 is attribute information that determines whether or not an icon is displayed on the home screen as described above. In the figure, the display is as follows.
  isLaunchable=true
This represents that the copy button is displayed.

Since the application is separated into the core logic 52 and the UI frame 54, the application list describes the correspondence therebetween.

The manifest file 56 is created for each application. Hence, it is desirable to set an identifier representing the type of each application and a unique identifier in the type. For example, the manifest file of the copy application has identifiers as follows.
  type:STD
  ID:copy
In these identifiers, type is an identifier representing a type (an application preinstalled), and ID is a unique identifier.

Further, the manifest file 56 includes information required at activation and information required for rendering the home screen as static information. The information required at activation is storage location information on the core logic 52 and storage location information on the UI frame 54. The framework 31 loads the core logic 52 with reference to the storage location information on the core logic 52. Also, the core logic 52 loads the UI frame 54 if required with reference to the storage location information on the UI frame 54.

The information required for rendering the home screen is storage location information on icon buttons and the display order of the buttons.

The manifest file 56 is referenced by an application management component in the device service layer and is used for creating an application list (described later).

Figure 9:
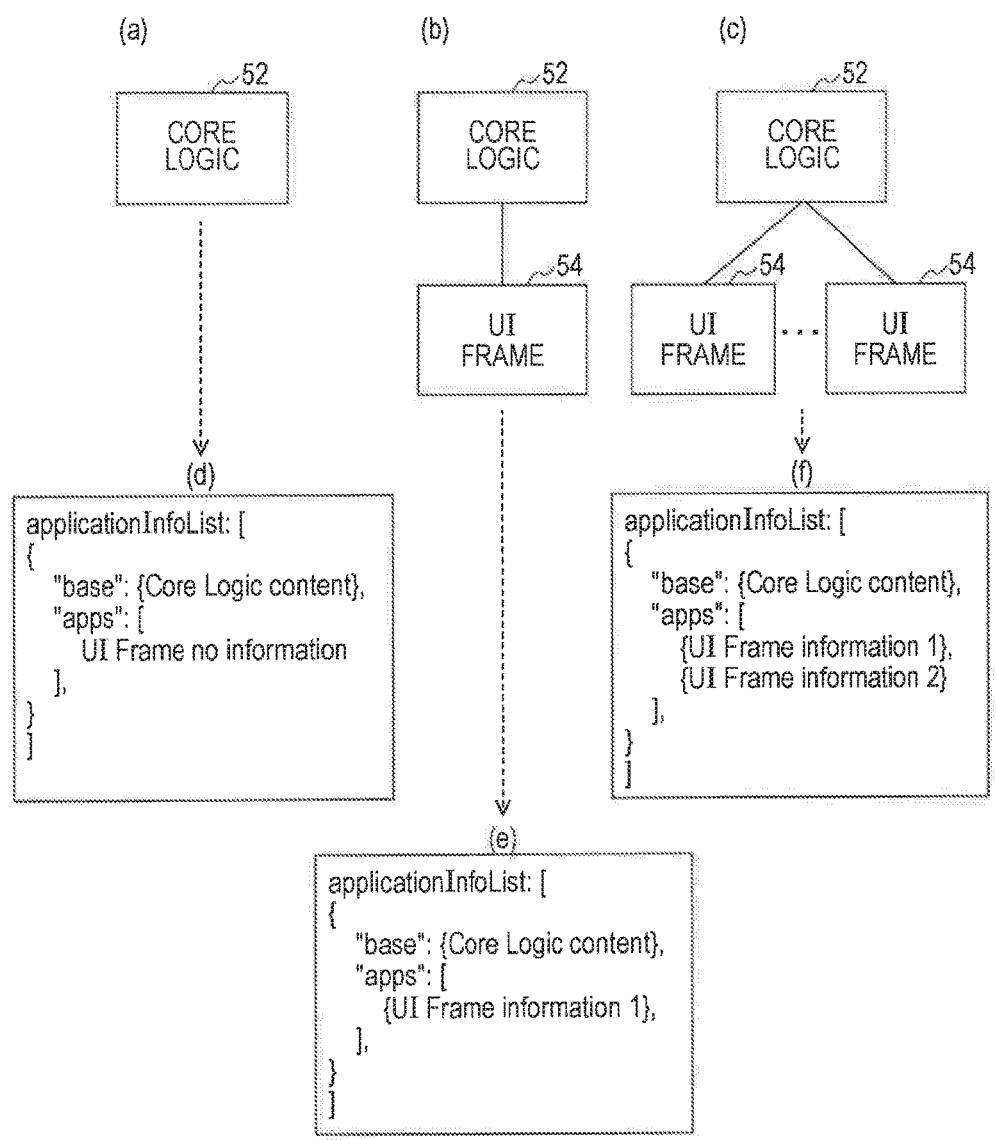
FIG. 9 provides explanatory views showing patterns of core logics and UI frames.

FIG. 9 shows patterns of implementation structures of applications.

Part (a) in FIG. 9 meets a pattern in which a core logic 52 is present but a UI frame 54 is not present. This does not correspond to an application preinstalled but corresponds to, for example, a companion application. Part (d) in FIG. 9 is an application list corresponding to part (a) in FIG. 9.

Part (b) in FIG. 9 meets a pattern in which a core logic 52 and a UI frame 54 are present by one-to-one correspondence. Part (e) in FIG. 9 is an application list corresponding to part (b) in FIG. 9.

In contrast, part (c) in FIG. 9 shows a case where a core logic 52 and plural UI frames 54 are present, and the plural UI frames 54 share the common core logic 52. A UI frame 54 determines a display style when a button is displayed on the home screen. Even when plural buttons are displayed, by sharing the common core logic 52, efficiency of implementation is increased. Also, if plural applications share the common core logic 52, performance of maintenance is increased. The number of UI frames 54 sharing the common core logic 52 is not limited. Part (f) in FIG. 9 is an application list corresponding to part (c) in FIG. 9. A specific example of a manifest file 56-1 is, for example, as follows.

```
{
    "id": "appId.std.copy",
    "url": "app/copy/baseframe/baseframe.html"
}
```

A specific example of a manifest file 56-2 is, for example, as follows.

```
{
    "subId": "copy",
    "type": "STD",
    "appUrl": "app/copy/copy/uiframe.html",
    "isLaunchable": true,
    "orderWeight": 100,
    "largeIcon":
"common/img/preset/app/app_copy_120.png",
    "smallIcon": "common/img/preset/app/app_copy_48.png",
```

-continued

```
    "displayName": "Copy",
    "displayNameId": "001"
}
```

Another example is as follows.

```
{
    "subId": "idcopy",
    "type": "STD",
    "appUrl": "app/copy/idcopy/uiframe.html",
    "isLaunchable": true,
    "orderWeight": 900,
    "largeIcon":
"common/img/preset/app/app_idcardcopy_120.png",
    "smallIcon":
"common/img/preset/app/app_idcardcopy_48.png",
    "displayName": "IDCardCopy",
    "displayNameId": "002"
}
```

In part (b) in FIG. 9 and part (c) in FIG. 9, by setting the isLaunchable attribute value of the manifest file 56-2 of the UI frame 54, it is determined whether or not a button is actually displayed on the home screen. For example, in part (c) in FIG. 9, in the case where the first UI frame 54 and the second UI frame 54 sharing the common core logic 52 are present, the manifest file of the first UI frame 54 is isLaunchable=true, and the manifest file of the second UI frame 54 is isLaunchable=false, the former one is displayed as a button but the later one is not displayed.

As an execution structure of an application, a core logic 52 is separated from a UI frame 54. Hence, only the UI frame 54 may be changed without changing the core logic 52, and the display style on the screen of an application may be easily customized.

FIGS. 10A to 10C each show an example of customizing the display style on the screen.

FIG. 10A is an initial display style. Focusing on an application of ID card copy, its UI frame 54 is idcopy/uiframe.html, and its manifest file 56-2 is idcopy/app_manifest.json.

FIG. 10B shows a case where the display style is customized. In the application of ID copy, the UI frame 54 and the manifest file 56-2 are replaced with idcopy_for_xxx/uiframe.html and idcopy_for_xxx/app_manifest.json for a new display style. Of course, it is also possible to replace only the manifest file 56-2.

In contrast, FIG. 10C shows a case where not the display style but the logic of the application is changed. In this case, all the core logic 52, the UI frame 54, and the manifest file 56 are replaced with new components. That is, the part indicated by copy/ is replaced with copy_for_xxx/.

Figure 11A:
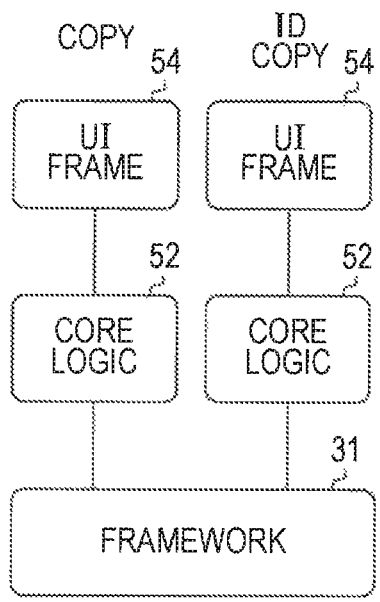
FIGS. 11A and 11B are explanatory views each showing a pattern of applications on a framework.
Figure 11B:
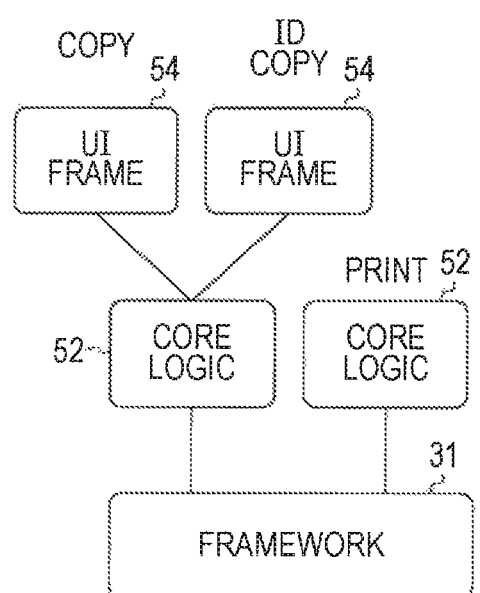

FIGS. 11A and 11B each show a pattern of an implementation structure of specific applications including a framework 31.

FIG. 11A shows an example of a pattern in a case where the copy application and the ID copy application are implemented. The copy application is separated into a core logic 52 and a UI frame 54. The core logic 52 communicates with a framework 31. The UI frame 54 communicates with only the core logic 52. Similarly, the ID copy application is separated into a core logic 52 and a UI frame 54. The core logic 52 communicates with the framework 31. The UI frame 54 communicates with only the core logic 52.

FIG. 11B is another example in a case where a print application is implemented in addition to the copy application and the ID copy application. The copy application and the ID copy application are separated into a common core logic 52 and respective UI frames 54. That is, the copy application and the ID copy application communicate with a framework 31 through the common core logic 52. Also, the print application has a core logic 52, but does not have a UI frame 54. FIGS. 11A and 11B include all patterns shown in FIG. 9.

In an application implementation structure of related art, a core logic 52 and a UI frame 54 are not separated from one another unlike the aforementioned structure, and processing and screen rendering are mixed, resulting in a complicated structure. Also, a common programming interface of applications is not present, and each application freely publishes a programming interface and freely references the programming interface. In contrast, in this exemplary embodiment, the framework 31 defines an application programming interface, and the core logic 52 of each application is necessarily implemented with the application programming interface. Hence, the direction of the application programming interface in this exemplary embodiment differs from that of related art. Also, in addition to communication between the framework 31 and each of applications, a communication programming interface among the applications may be realized by an application programming interface publication function and an application programming interface reference function provided by the framework 31.

In theory, plural applications may share a common UI frame 54 and may respectively have individual core logics 52. However, in this case, the structure may be complicated in the viewpoint of the framework 31, and hence this case is not particularly described in this exemplary embodiment. Of course, it is not necessarily intended to exclude this pattern.

Life Cycle Management for Application

Figure 12:
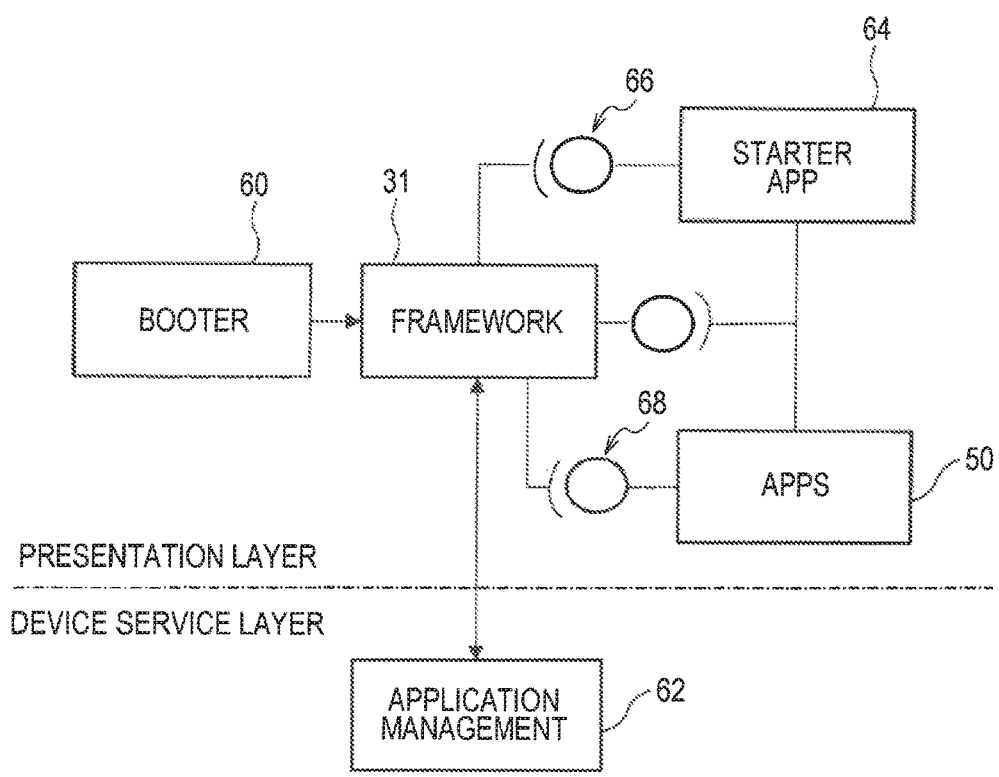
FIG. 12 is a system configuration diagram of life cycle management including a booter and a starter.

FIG. 12 shows a basic configuration when a framework 31 executes life cycle management for each application. In this case, the framework 31 is an execution environment of applications.

A framework 31 and various applications 50, and in addition, a booter 60 and a starter application 64 are present in the presentation layer. Also, an application management component 62 is present in the device service layer.

The booter 60 is a component that executes activation/deactivation management of the entire presentation layer. The framework 31 is initialized and activated by the booter 60.

The application management component 62 provides an application list to the framework 31 on the basis of manifest files 56 of the various applications 50.

The starter application 64 is an application that is implemented with a starter I/F 66 defined by the framework 31. The starter application 64 is only one application present in the system, and is called from the framework 31 when initialization of all the applications 50 is completed.

The various applications 50 include the copy application, ID copy application, fax application, and so forth, and include core logics 52 as described above. The core logics 52 of the various applications 50 each are implemented with an application I/F 68 defined by the framework 31.

Specifically, the application programming interface implemented in each application 50 is as follows.

Initialization processing (initialize)
Finalization processing (finalize)
Window pushed out processing (windowPushedOut)
Window prepare exposed processing (windowPrepareExposed)

Window prepare terminated processing (windowPrepareTerminated)

Each application 50 is implemented with a handler for these events.

The framework 31 includes a JavaScript component (referred to as communication control component) for enabling publication/call of a method, and publication/purchase/issue of an event among the core logics 52 of the various applications 50. A method may be defined to take a desirable parameter and to return a desirable return value. The published method is independently managed on an application basis. The application that calls the method may check completion of processing of the method by callback. Also, an event may be defined by each application with desirable data. The published event is independently managed on an application basis. To be more specific, the communication control component enables publication and call of a method by the core logic 52, enables definition and issue of an event and registration of a listener, publishes the method by "on," and stops the publication of the method by "off." The published method is able to be called by call. For example, the type I application sets a certain application programming interface "on" for publication to the framework 31, and the type II application makes "call" for the published programming interface of the type I application to the framework 31.

Publication/call of a method, and publication/purchase/issue of an event are described below according to more specific specifications (application programming interface, or API).

An object of Arena com being a JavaScript component is arenaCom, and a method is published by arenaCom.on (methodName,methodFunc). A parameter methodName is the name of a method to be published, and methodFunc is the entity of method processing to be published. The published method is able to be called by call.

The publication of the method is stopped by arenaCom.off (methodName). methodName is the name of a method the publication of which is to be stopped.

The published method is called by arenaCom.call(appid, methodName,args,callbacl). Appid is an application ID of the method publication source, methodName is a publication method name for call, args is a parameter, and callback is callback to be called at completion of the method processing.

An event is published by arenaCom.publishEvent(eventName). eventName is the name of an event to be published. The listener is able to be registered for the event immediately after the publication. Also, an event is unpublished by arenaCom.unpublishEvent(eventName). eventName is the name of an event to be unpublished.

A listener is registered for the published event by arenaCom.addListener(appid,eventName,listenerFunction,completeCallback). Appid is an application ID the event of which is published, eventName is the name of an event to be received, listenerFunction is the entity of processing to be called at occurrence of an event, and completeCallback is callback to be called at completion of the registration of the listener.

An event is fired by arenaCom.fireEvent(EventName, data,completeCallback). EventName is the name of an event to be fired, data is data accompanying the event, and completeCallback is callback to be called at completion of firing to all listeners for the event.

An event is fired for a specific listener by arenaCom.fireEventTo(listenerid,eventName,data,completeCallback). listenerid is the application ID of an event notification target, and completeCallback is callback to be called at completion of firing to the specific listener for the event.

Figure 13:
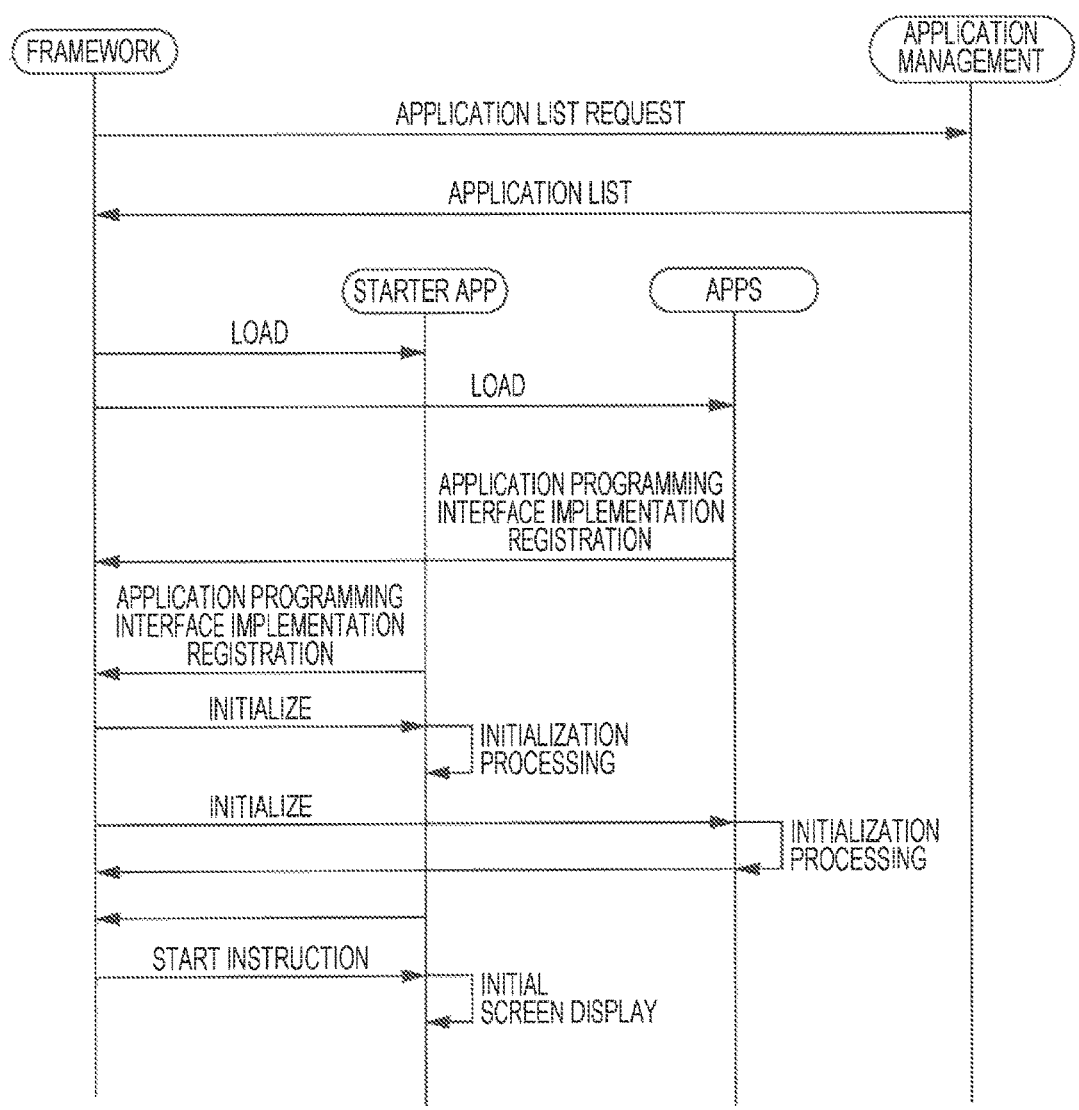
FIG. 13 is a sequence diagram of the life cycle management.

FIG. 13 is a sequence diagram of life cycle management for each of the various applications by the framework 31.

When the booter 60 activates the framework 31, the framework 31 requests an application list from the application management component 62 in the device service layer, and acquires the application list from the application management component 62.

When the framework 31 acquires the application list, the framework 31 creates a base frame on an application basis according to the list, and loads the various applications 50 including the starter application 64 (load phase). That is, the framework 31 reads the core logic 52 of each application. To be specific, the framework 31 loads the core logic 52 with reference to storage location information on the core logic 52 defined in the manifest file 56. The base frame is a frame for executing the core logic 52 of each application, and this frame is not displayed. The load order of the core logics 52 of the respective applications is desirably determined and the order is not particularly limited. This phase goes to the next phase at a time point at which all the applications have completed registration of application programming interface implementation.

It is to be noted that the method and event of each application are published before the registration processing of the application programming interface implementation.

Next, the framework 31 gives an instruction of initialization to each application through the application programming interface (initialize phase). To be specific, the framework 31 issues "app" event and "initialize" method to each application. At a time point at which all the applications callback after the process completion in response to the initialization instruction, the framework 31 notifies the booter 60 about the completion of the initialization processing, and the phase goes to the next phase. The order of initialization of the respective applications may be also desirably determined. In this initialization processing, each application executes data acquisition from the device service layer.

Then, the booter 60 gives a start instruction for provision of a function by an application to the framework 31, and the framework 31 gives a start instruction to the starter application 64 in response to the given instruction (start phase). The starter application 64 acquires information on an initial activation application managed in the device service layer, and displays an initial screen. This phase is completed at a time point at which the starter application 64 callbacks after the process completion in response to the start instruction.

At deactivation of the system, the framework 31 gives an instruction of finalization to the core logic 52 of each application. Also, the framework 31 deletes the base frame of each application.

In the load phase, the core logics 52 of the respective applications are read without a particularly limited order. Hence, even when an application is added, the load phase does not have to be changed. Also, in the initialize phase, all the applications are initialized. Hence, the other applications are assuredly called, and individual synchronization is not required. As described above, since the synchronization among the applications is no longer required and only the core logics 52 with relatively small sizes are loaded, the system activation time and the application activation time are reduced.

If each application independently publishes an application programming interface, activation, pre-initialization processing, initialization processing, post-initialization processing, stop, temporary stop, and so forth, are different on an application basis. A difference is generated in initialization level of each application, and the timing at which the application is able to be called also varies. In particular, it is required to check whether or not a subject application is able to be called before the application is called. The control may be complicated. In contrast, in the exemplary embodiment, the initialization time may be reduced as described above, and the activation time of the home screen after the initialization may be reduced.

Figure 14:
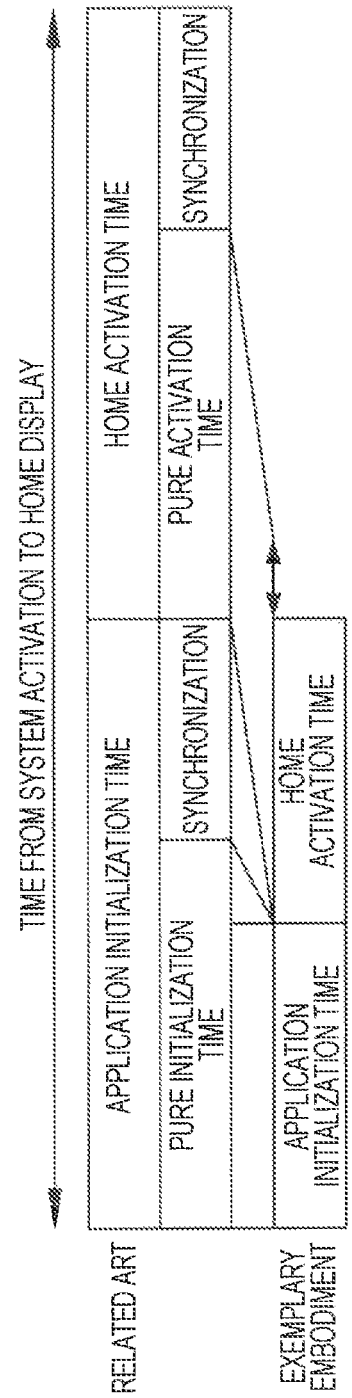
FIG. 14 is a graph showing the time from system activation to home screen display.

FIG. 14 shows the time from system activation to home screen display according to related art and the exemplary embodiment.

In related art, the application initialization time requires synchronization in addition to pure initialization time, and the activation time of the home screen requires synchronization in addition to pure activation time similarly. In contrast, in this exemplary embodiment, the pure initialization time may be reduced, and the synchronization may be eliminated. Also, for the home activation time, similar effect may be provided. In related art, if applications depend on one another, adjustment is required to prevent deadlock from being generated. However, in this exemplary embodiment, such dependence is not present, and hence deadlock adjustment is no longer required.

As described above, in this exemplary embodiment, an application is separated into a core logic 52 and a UI frame 54, an application programming interface defined by a framework 31 is implemented in the core logic 52, the core logic 52 communicates with a core logic 52 of another application through the framework 31, and the UI frame 54 communicates with only the core logic 52 of the application. Accordingly, each application has a common configuration defined by the framework 31, and may be configured to have a low link degree with another application. An application may be easily added or deleted.

A case of implementing an application which may be added is described next. As described above, applications include an application preinstalled and an application that may be added. The application preinstalled is software that provides an application programming interface defined by the framework 31, and may be called internal application. In contrast, the application which may be added may be an existing application or may be an application provided by a third party. Hence the application which may be added is an external application that does not necessarily provide an application programming interface defined by the framework 31. With regard to this, it is desirable to implement an application that may be added in a later phase (hereinafter, referred to as "external application") without adding a large correction and to prevent the external application from affecting the operation of another internal application even if the operation of the external application is unstable or abnormal.

Therefore, as described above, a special companion application is assigned to an external application in accordance with the type of external application, and the external application is executed while the companion application is arranged between the framework 31 and the external application.

Figure 15:
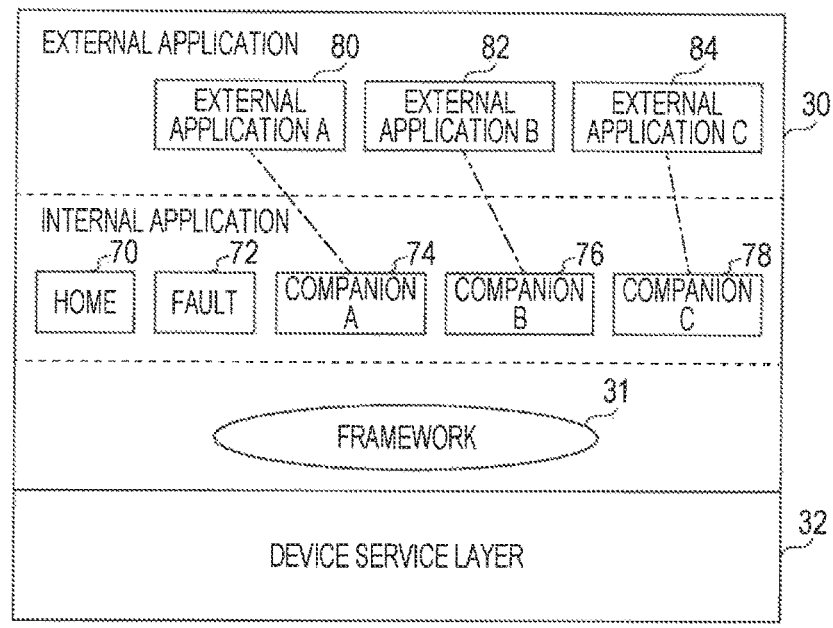
FIG. 15 is a logical configuration diagram when an external application is implemented.

FIG. 15 shows a logical configuration of a system including an external application and a companion application. FIG. 15 corresponds to FIG. 2. The presentation layer 30 is implemented with, as internal applications, a home application 70, a fault application 72 that controls a screen in an abnormal situation, and companion applications 74, 76, and 78. The presentation layer 30 is also implemented with, as external applications, an external application A 80, an external application B 82, and an external application C 84. The companion application 74 is a companion application corresponding to the external application A 80. The companion application 76 is a companion application corresponding to the external application B 82. The companion application 78 is a companion application corresponding to the external application C 84. The companion applications 74, 76, and 78 each are software that is arranged between the framework 31 and corresponding one of the external application A 80, the external application B 82, and the external application C 84. The framework 31 has a function of absorbing conditions requested to the external applications A 80, B 82, and C 84. When a user operates a button on the home screen of any of the companion applications 74, 76, and 78, corresponding one of the external applications A 80, B 82, and C 84 is activated in response to the request from the home application 70. Since the companion applications 74, 76, and 78 absorb the requests as the internal applications, the companion applications 74, 76, and 78 may satisfy the requirements as the internal applications without correction of the external applications A 80, B 82, and C 84.

Figure 16:
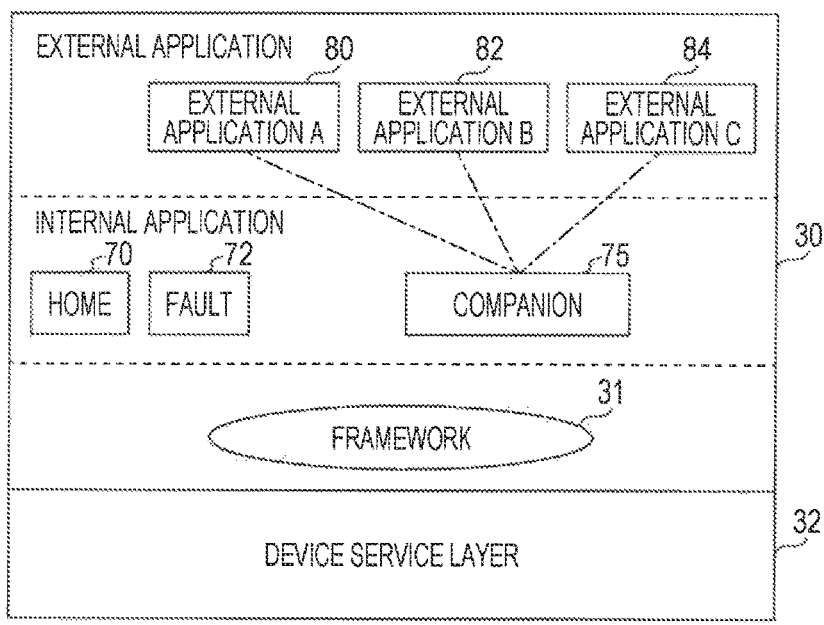
FIG. 16 is another logical configuration diagram when an external application is implemented.

FIG. 16 shows another logical configuration. In this configuration, a companion application is not implemented for each of external applications, but a single companion application 75 manages plural external applications. A companion application 75 is a companion application corresponding to the external applications A 80, B 82, and C 84. The companion application 75 is software that is arranged between the framework 31 and the external applications A 80, B 82, and C 84. The framework 31 has a function of absorbing conditions requested to the external applications A 80, B 82, and C 84.

When an external application is activated, it is desirable to keep screen transition and operability of screen similar to those of an internal application to construct the entire system seamlessly. Hence, applications are activated respectively by different browsers so that an internal application is activated by an internal browser and an external application is activated by an external browser. Even if an abnormality occurs in the external browser, the abnormality does not affect the internal browser. The framework 31 collectively manages the internal browser and the external browser. To be more specific, the framework 31 generally manages the external browser as one type of window in addition to a normal iframe-base window. In this way, the internal browser and the external browser are collectively managed and controlled as windows, and hence screen control information on the internal application and screen control information on the external application are integrated. Thus, the control is simplified.

In this exemplary embodiment, while the framework 31 collectively manages the internal browser and the external browser and generally manages the external browser as one type of window in addition to the normal iframe-base window, a system may be constructed in which a companion application has a supervisory function of switching between the internal browser and the external browser in accordance with the situation.

Figure 17:
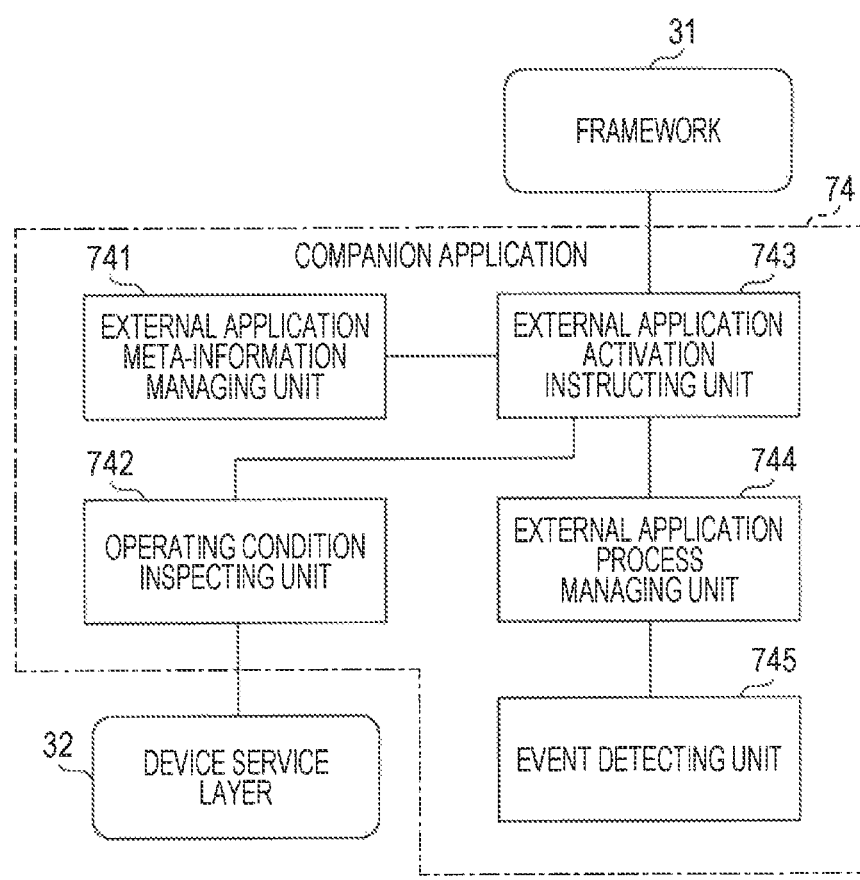
FIG. 17 is a configuration diagram of a companion application.

FIG. 17 is a functional block diagram of the companion application 74. This functional block diagram may be similarly applied to each of the companion applications 75, 76, and 78.

The companion application 74 includes, as functional modules, an external application meta-information managing unit 741, an operating condition inspecting unit 742, an external application activation instructing unit 743, an external application process managing unit 744, and an event detecting unit 745.

The external application activation instructing unit 743 provides external application button information to the home application 70 through the framework 31, and receives a launch command from the home application 70 through the framework 31 in response to an operation on an external application button by a user. When the external application activation instructing unit 743 receives the launch command, the external application activation instructing unit 743 provides a creation command for a window and a display command for the window to the framework 31, and updates information on the external application process managing unit 744.

The external application meta-information managing unit 741 stores manifest information on the companion application 74.

The operating condition inspecting unit 742 checks the presence of the authority at reception of an activation command.

The external application process managing unit 744 stores an external application process created by the creation command for the window.

The event detecting unit 745 receives an external application termination request command.

The companion application 74 may include an abnormal termination detector that receives a notification about abnormal termination of the external process when the external process is abnormally terminated and updates the management information on the external application process managing unit 744, and a context change detector that detects logout etc., terminates the external application in operation, and clears the cache.

FIG. 18 shows an example of the manifest information stored in the external application meta-information managing unit 741. In FIG. 18, "type" indicates the type of an application and "EXT" indicates that the application is an external application. Also, "subId" indicates ID within the type. Also, "appUrl" indicates URL with which the external browser is opened. Further, "toolsIcon" and "displayName" indicate an icon and its name to be displayed on the home screen.

Figure 19:
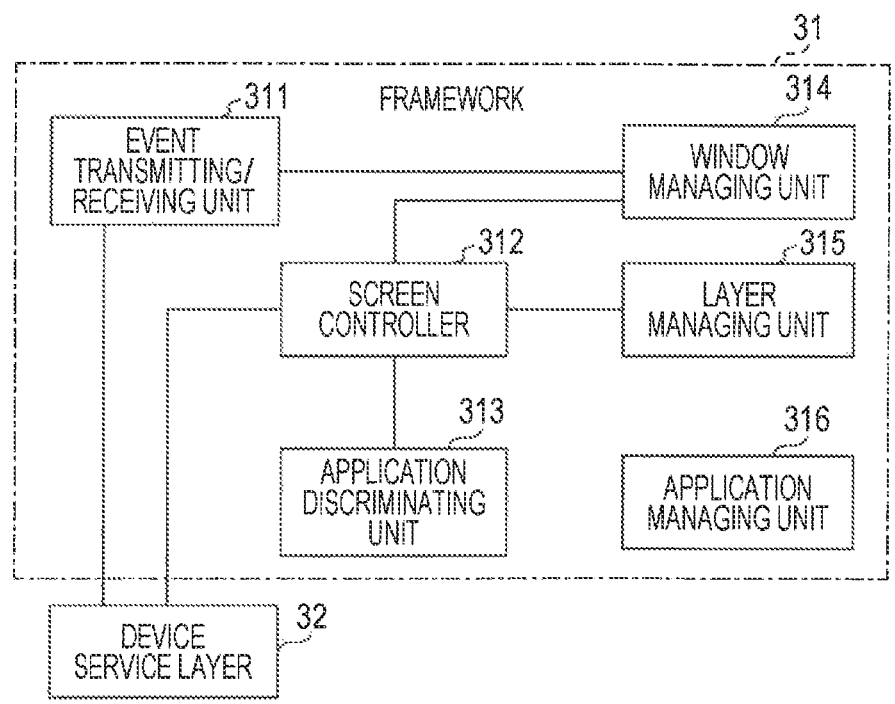
FIG. 19 is a configuration diagram of a framework.

FIG. 19 is a functional block diagram of the framework 31. The framework 31 includes, as functional modules, an event transmitting/receiving unit 311, a screen controller 312, an application discriminating unit 313, a window managing unit 314, a layer managing unit 315, and an application managing unit 316.

The screen controller 312 controls the entire flow. That is, the screen controller 312 performs the entire control from when the creation request for the window is received from the outside to when the result is returned. Also, the screen controller 312 creates the window management information and adds the information to the window managing unit 314.

The application discriminating unit 313 discriminates a call for a function to be called by using the type of application. That is, the application discriminating unit 313 discriminates a call in accordance with whether the function is a function for an internal application or a function for an external application. To be specific, the application discriminating unit 313 stores a table that determines the correspondence between the type of application and the function, and discriminates a call by using this table.

The layer managing unit 315 manages the layer structure. The layer managing unit 315 manages an active window in each layer. Specifically, the layer managing unit 315 manages the layer structure in the order of an application layer, a popup layer, a banner layer, an alert (low level) layer, an alert (high level) layer, and a fault layer, and inserts a window for an external application into a layer below an application layer of an internal application.

The window managing unit 314 manages information on each window by using a window ID. The window information includes internal window information and external application window information.

Figure 20:
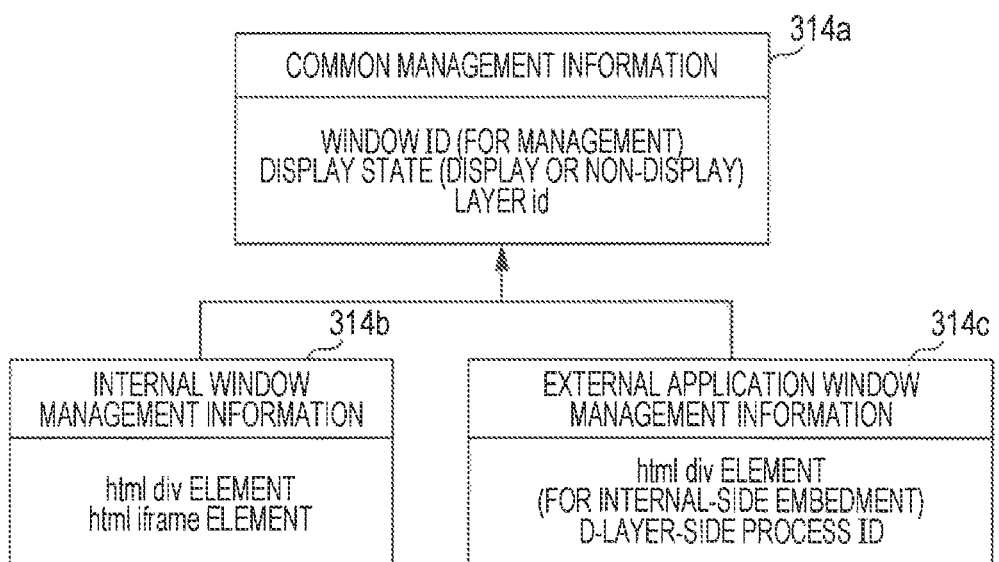
FIG. 20 is a configuration diagram of window management information.

FIG. 20 shows an example of window management information managed by the window managing unit 314. The window management information is configured of common management information 314a, and internal window management information 314b or external application window management information 314c. In case of an internal application, the window management information is configured of the common management information 314a and the internal window management information 314b. In case of an external application, the window management information is configured of the common management information 314a and the external application window management information 314c. The common management information 314a includes a window ID, a display state, and a layer id that determines a layer. The internal window management information 314b includes a div element of html and an iframe element of html for an internal window. The external application window management information 314c includes a div element of html and a process ID of a device service layer (D layer) for an external window. In this case, the div element of html for the external window is a div element for embedding the external window into the internal window. The div element of html for the external window is an empty div element having only a transparent frame, that is, the div element functions as a dummy div element. By inserting the dummy div element into the screen layer in the same manner as treating iframe for the internal application, seamless screen control may be performed.

Operations of respective functional modules of the companion application 74 and respective functional modules of the framework 31 are described in further detail.

Figure 21:
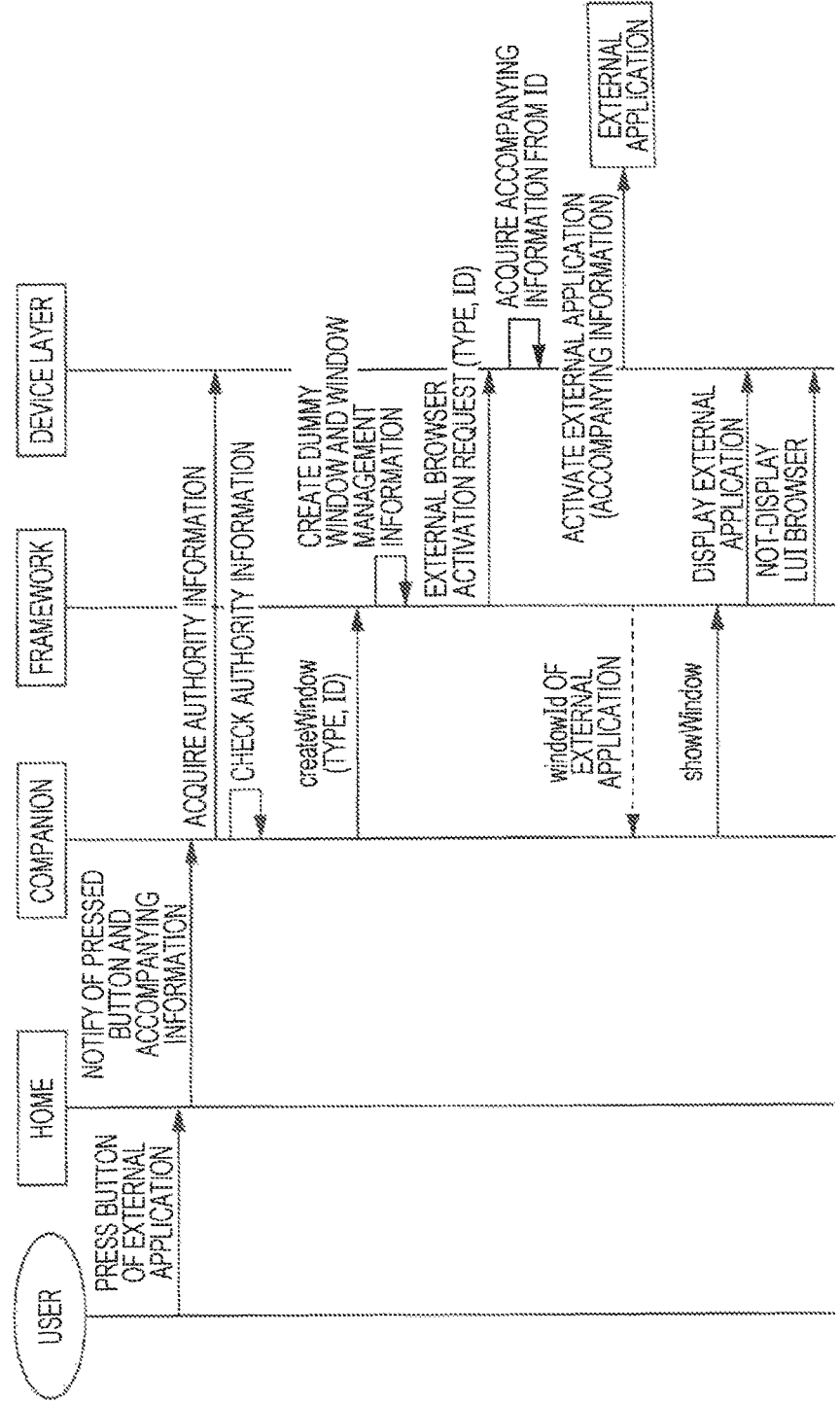
FIG. 21 is an activation sequence diagram of the external application.

FIG. 21 shows a sequence from when a user operates a button of an external application on the home screen to when the external application is displayed. The sequence corresponds to processing by the user, the home application 70, the companion application 74 (or the companion application 75, 76, or 78), the framework 31, and the device service layer (device layer) 32.

When the user presses the external application button, the home application 70 transmits the launch command and its accompanying information for the button pressed by the user to the companion application 74. The accompanying information includes the ID of the external application, that is, subId of manifest information.

The external application activation instructing unit 743 of the companion application 74 receives the launch command from the home application 70, and acquires external application meta-information from the external application meta-information managing unit 741 on the basis of the external application ID. Also, the external application activation instructing unit 743 commands the operating condition inspecting unit 742 to check whether or not the activation condition of the designated external application is satisfied. The operating condition inspecting unit 742 of the companion application 74 acquires the current user from the framework 31, acquires the authority owned by the current user from an authority information managing unit of the device service layer 32, and checks whether or not the current user has the authority to activate the designated external application. The external application activation instructing unit 743 of the companion application 74 issues a creation command for a window (createWindow) to the framework 31. In this case, specific information on the external application, or more specifically the type and ID of the external application are provided.

When the screen controller 312 of the framework 31 receives the creation command for the window (createWindow) from the companion application 74, the application discriminating unit 313 determines the function that is used by the application discriminating unit 313 for creating window information. The screen controller 312 executes the window creation function for the external application determined by the application discriminating unit 313, and creates window management information. The window management information is configured of common management information 314a and external application window management information 314c. The external application window management information 314c may include the dummy div element for embedment at the internal side as described above. The screen controller 312 adds the created window management information to the window managing unit 314. The screen controller 312 commands the device service layer 32 to activate the external application on the basis of the management information. To be specific, the screen controller 312 gives a command for an external browser activation request together with the type and ID of the external application.

The device service layer 32 activates the designated external application and returns its process ID to the framework 31. The device service layer 32 non-displays the created external application window and arranges the created external application window in a layer lower than the layer of the inner browser window.

When the framework 31 receives the process ID, the framework 31 returns the window ID of the external application to the companion application 74 as the result of the window creation command (createWindow).

The companion application 74 issues an external application display request (showWindow) to the framework 31.

When the screen controller 312 of the framework 31 receives the external application display request (showWindow), the screen controller 312 starts display processing for the designated window, and if another different window displayed in the same layer is present, the screen controller 312 starts non-display processing for the different window (pushed out processing). If the designated window is an external application window, div, which is created as a dummy or an alias at the internal side is displayed, and the external application window is displayed. Then, the window designated by the layer managing unit 315 is registered as a window in the lowermost layer. Also, the screen controller 312 determines whether or not the internal browser window is displayed or not. That is, the screen controller 312 makes an inquiry to the layer managing unit 315, checks the window displayed in each layer, displays the internal browser if a window, such as a banner or a fault, is displayed at the internal side in a layer other than the lowermost layer, and non-displays the internal browser if not (in the figure, the internal side is abbreviated as LUI).

Figure 22:
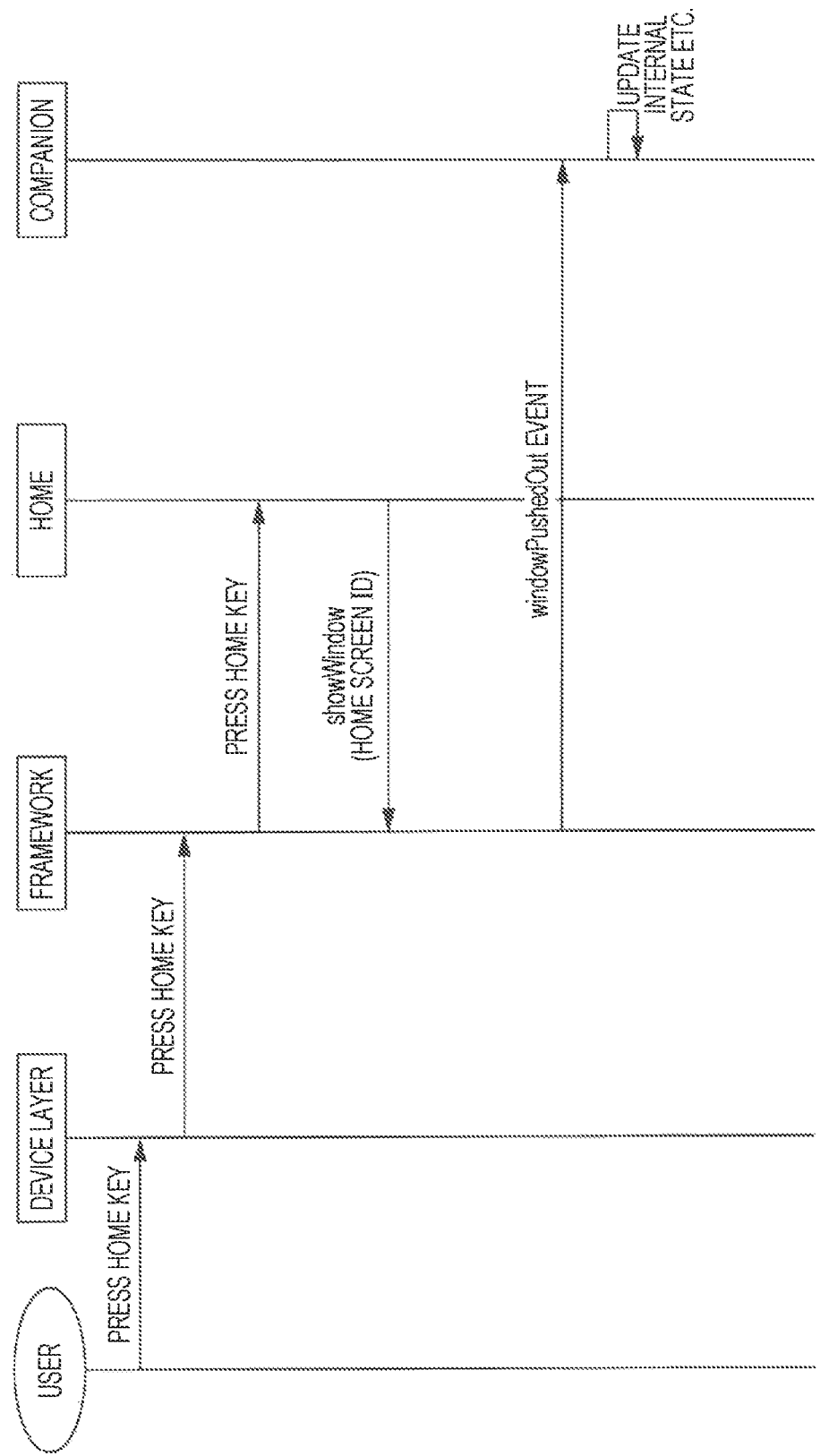
FIG. 22 is a window pushed out sequence diagram of the external application.

FIG. 22 shows a sequence for pushed out processing.

It is expected that the external application window is displayed on the screen and a user presses a home key from this state.

When the device service layer 32 detects press of the home key by the user, the device service layer 32 provides press of the home key to the framework 31.

When the event transmitting/receiving unit 311 of the framework 31 receives the press event of the home key, the event transmitting/receiving unit 311 notifies the home application 70 about the home key press event.

When the home application 70 receives the home key press event, the home application 70 designates the window ID of the created home screen to the framework 31, and calls window display (showWindow).

When the screen controller 312 of the framework 31 receives the window display (showWindow), the screen controller 312 starts display processing for the designated window, and if another different window displayed in the same layer is present, the screen controller 312 starts non-display processing for the different window. If the non-displayed window is an external application window, div, which is created as a dummy or an alias at the internal side, is non-displayed, and the external application window is non-displayed. Then, the screen controller 312 notifies the companion application 74 about a pushed out event (windowPushedOut). This pushed out event notification is a notification that the external application window is not displayed. Accordingly, the external application window is non-displayed by the display command for the home screen.

When the companion application 74 receives the pushed out event (windowPushedOut), the event detecting unit 745 detects the pushed out event, and executes necessary processing, or more specifically, updates internal window state management information.

Figure 23:
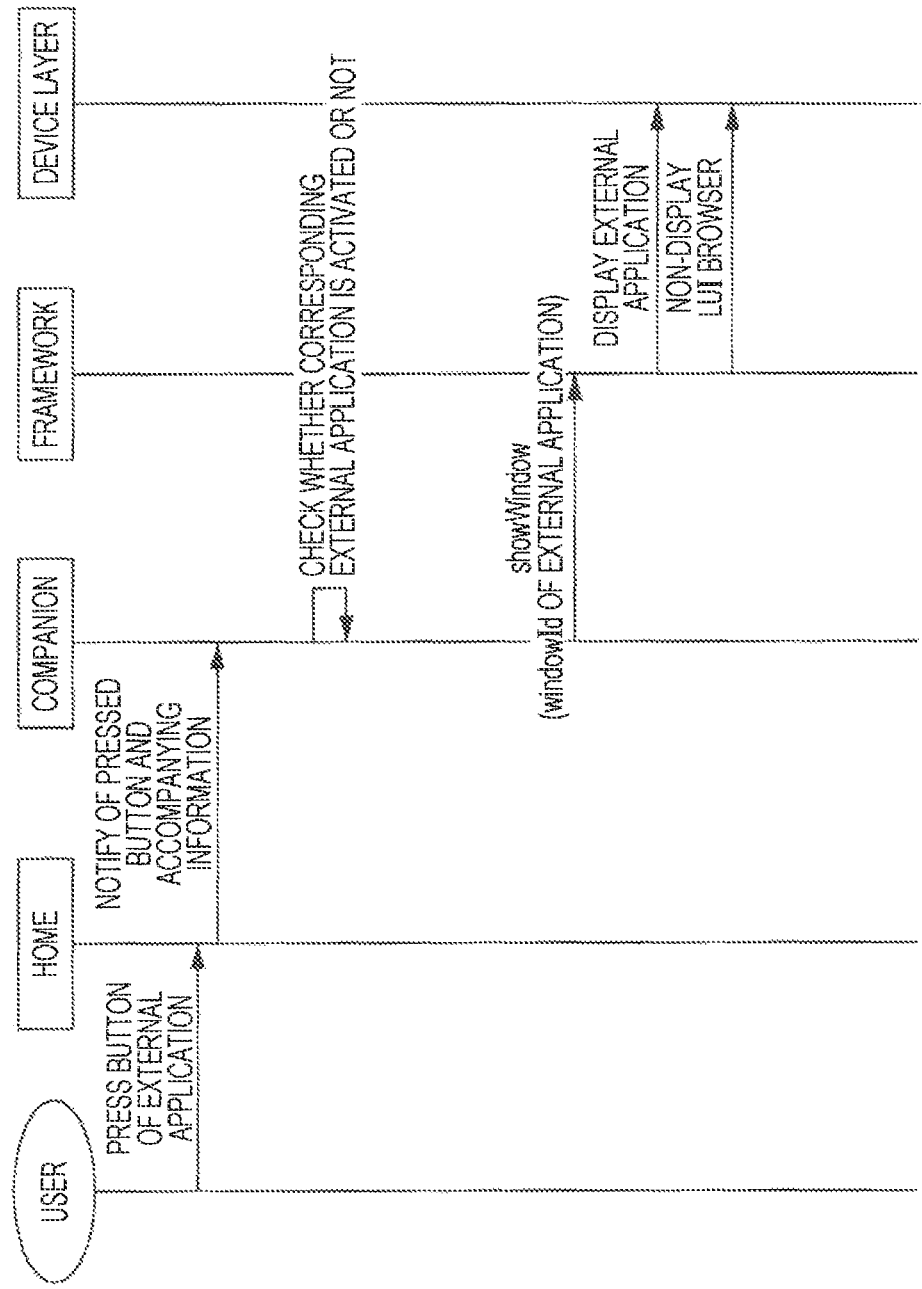
FIG. 23 is a re-display sequence diagram of the external application.

FIG. 23 is a sequence diagram in which, when a user presses an external application button on the home screen, an external application which is activated already is present and the external application is non-displayed.

When the user presses the external application button on the home screen, the home application 70 notifies the companion application 74 about the launch command and its accompanying information for the pressed button, that is, the external application ID (subId in the manifest information).

When the external application activation instructing unit 743 of the companion application 74 receives the launch command, the external application activation instructing unit 743 makes an inquiry to the external application process managing unit 744 on whether or not the designated external application is activated already. If the designated external application is activated already, the external application activation instructing unit 743 acquires the window ID corresponding to the external application ID from the external application process managing unit 744, and issues an external application display request (showWindow) to the framework 31.

When the screen controller 312 of the framework 31 receives the external application display request (showWindow), the screen controller 312 starts display processing for the designated window, and if another different window displayed in the same layer is present, the screen controller 312 starts non-display processing for the different window (pushed out processing). If the designated window is an external application window, div, which is created as a dummy or an alias at the internal side is displayed, and the external application window is displayed. Then, the window designated by the layer managing unit 315 is registered as a display window in the lowermost layer. Also, the screen controller 312 determines whether or not the internal browser window is displayed or not. That is, the screen controller 312 makes an inquiry to the layer managing unit 315, checks the window displayed in each layer, displays the internal browser if a window, such as a banner or a fault, is displayed at the internal side in a layer other than the lowermost layer, and non-displays the internal browser if not.

Figure 24:
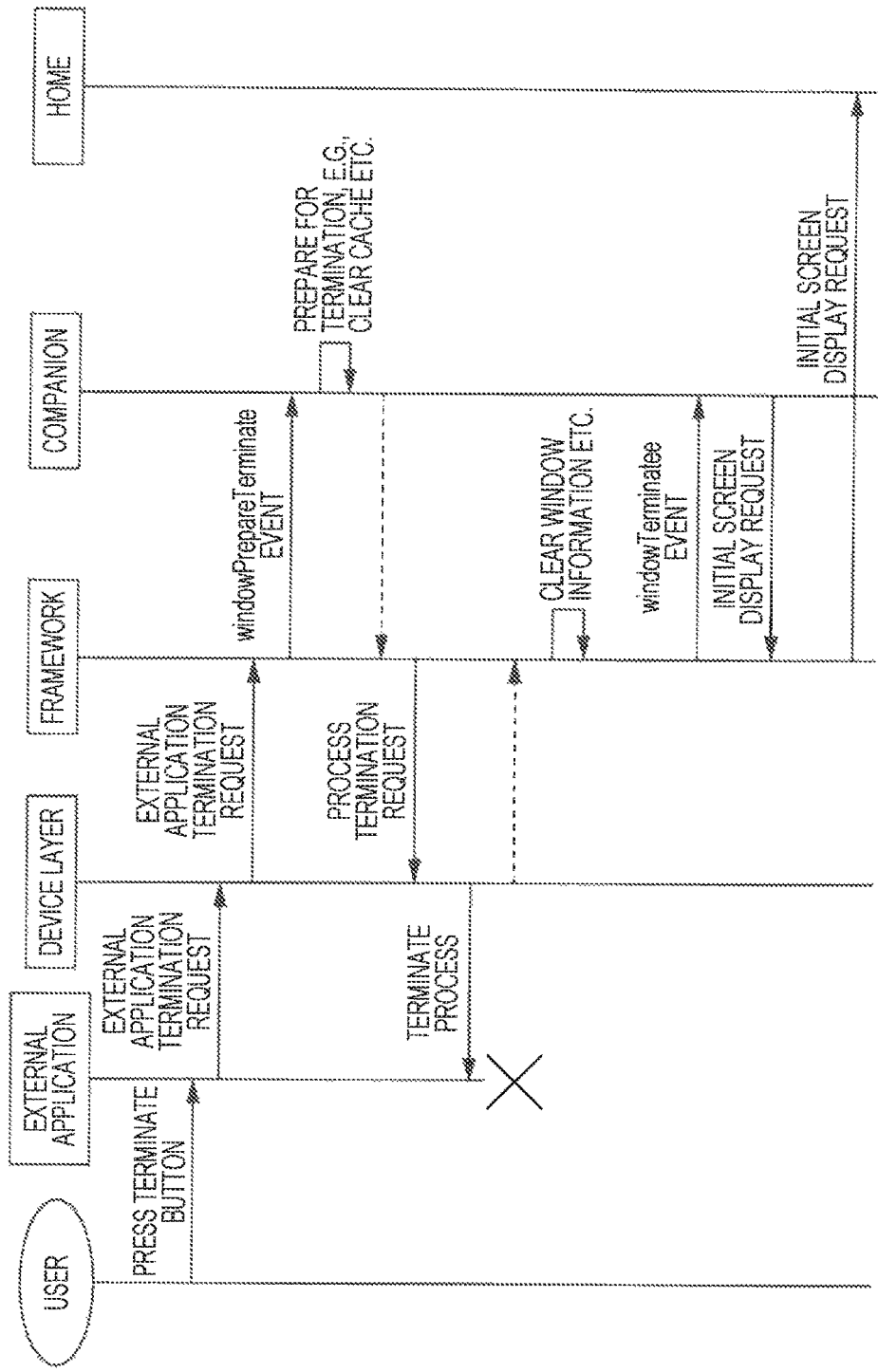
FIG. 24 is a sequence diagram at normal termination of the external application.

FIG. 24 is a sequence diagram at normal termination of an external application. In other words, FIG. 24 is a sequence diagram when a user presses a terminate button in the external application.

When the user presses the terminate button of the external application, the external application notifies the device service layer 32 about a termination request.

When the device service layer 32 receives the termination request from the external application, the device service layer 32 notifies the framework 31 about the termination request.

When the event transmitting/receiving unit 311 of the framework 31 receives the termination request including the process ID, the event transmitting/receiving unit 311 instructs the window managing unit 314 to convert the process ID into the window ID. Then, the event transmitting/receiving unit 311 issues a window prepare terminated event (windowPrepareTerminated) to the companion application 74.

The event detecting unit 745 of the companion application 74 receives the window prepare terminated event from the framework 31, and prepares for termination of the external application. That is, the preparation includes clearing the history and cache of a browser and deleting a listener from an authentication application. The event detecting unit 745 notifies the framework 31 about window termination preparation completion.

When the event transmitting/receiving unit 311 of the framework 31 receives the window termination preparation completion notification from the companion application 74, the event transmitting/receiving unit 311 issues a process termination request to the device service layer 32, and deletes the displayed window of the layer managing unit 315. Also, the event transmitting/receiving unit 311 deletes the window information from the window managing unit 314. Further, the event transmitting/receiving unit 311 issues a window terminated event (windowTerminated) to the companion application 74.

When the event detecting unit 745 of the companion application 74 receives the window terminated event from the framework 31, the event detecting unit 745 instructs the external application process managing unit 744 to delete the management information on the process, and issues an initial screen display request to the framework 31.

When the application managing unit 316 of the framework 31 receives the initial screen display request from the companion application 74, the application managing unit 316 issues an initial screen display request to the home application 70 (initial activation application). Accordingly, the home screen is displayed as an initial screen. Alternatively, a screen other than the home screen may be set as the initial screen.

Figure 25:
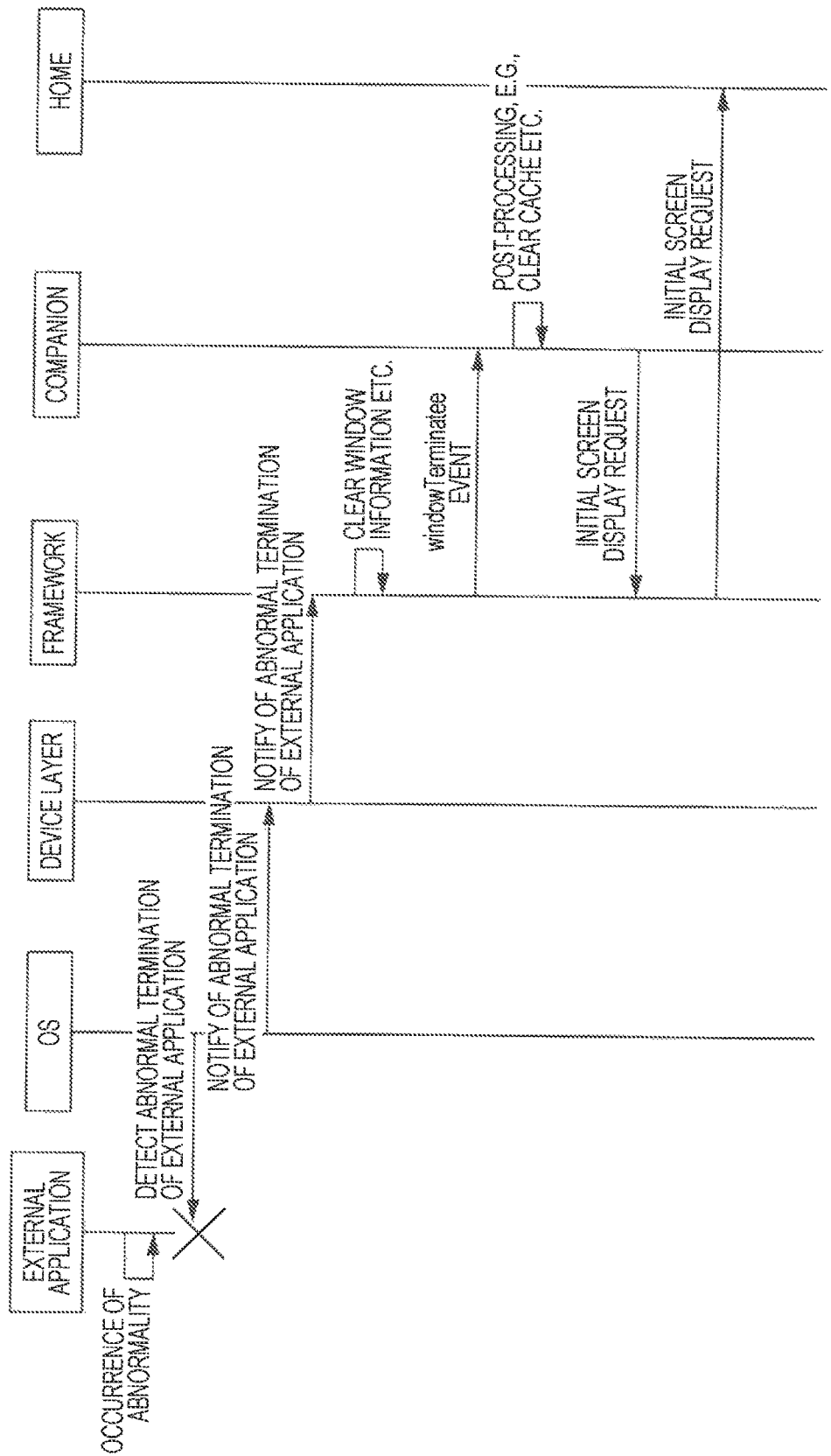
FIG. 25 is a sequence diagram at abnormal termination of the external application.

FIG. 25 is a sequence diagram at abnormal termination of an external application. In other words, FIG. 25 is a sequence diagram when a process of an external application is abnormally terminated due to a certain cause, such as memory insufficiency or a segmentation fault. The user may view the external application in operation, or the external application may be present in background by the pushed out processing.

When the operating system (OS) detects abnormal termination of the external application, the device service layer 32 notifies the framework 31 about the external application abnormal termination.

When the event transmitting/receiving unit 311 of the framework 31 receives the external application abnormal termination notification including the process ID, the event transmitting/receiving unit 311 instructs the window managing unit 314 to convert the process ID into the window ID, and if the external application window is being displayed, the event transmitting/receiving unit 311 deletes the displayed window of the layer managing unit 315. Also, the event transmitting/receiving unit 311 deletes the window information from the window managing unit and issues a window terminated event (windowTerminated) to the companion application 74.

When the event detecting unit 745 of the companion application 74 receives the window terminated event from the framework 31, the event detecting unit 745 instructs the external application process managing unit 744 to delete the management information on the process, and executes other required post-processing. Further, if the external application is being displayed, the event detecting unit 745 issues the initial screen display request to the framework 31.

When the application managing unit 316 of the framework 31 receives the initial screen display request, the application managing unit 316 issues the initial screen display request to the home application 70 (initial activation application). If the external application is abnormally terminated, an error notification may be made by a banner or a fault instead of the home screen as the initial screen.

Figure 26:
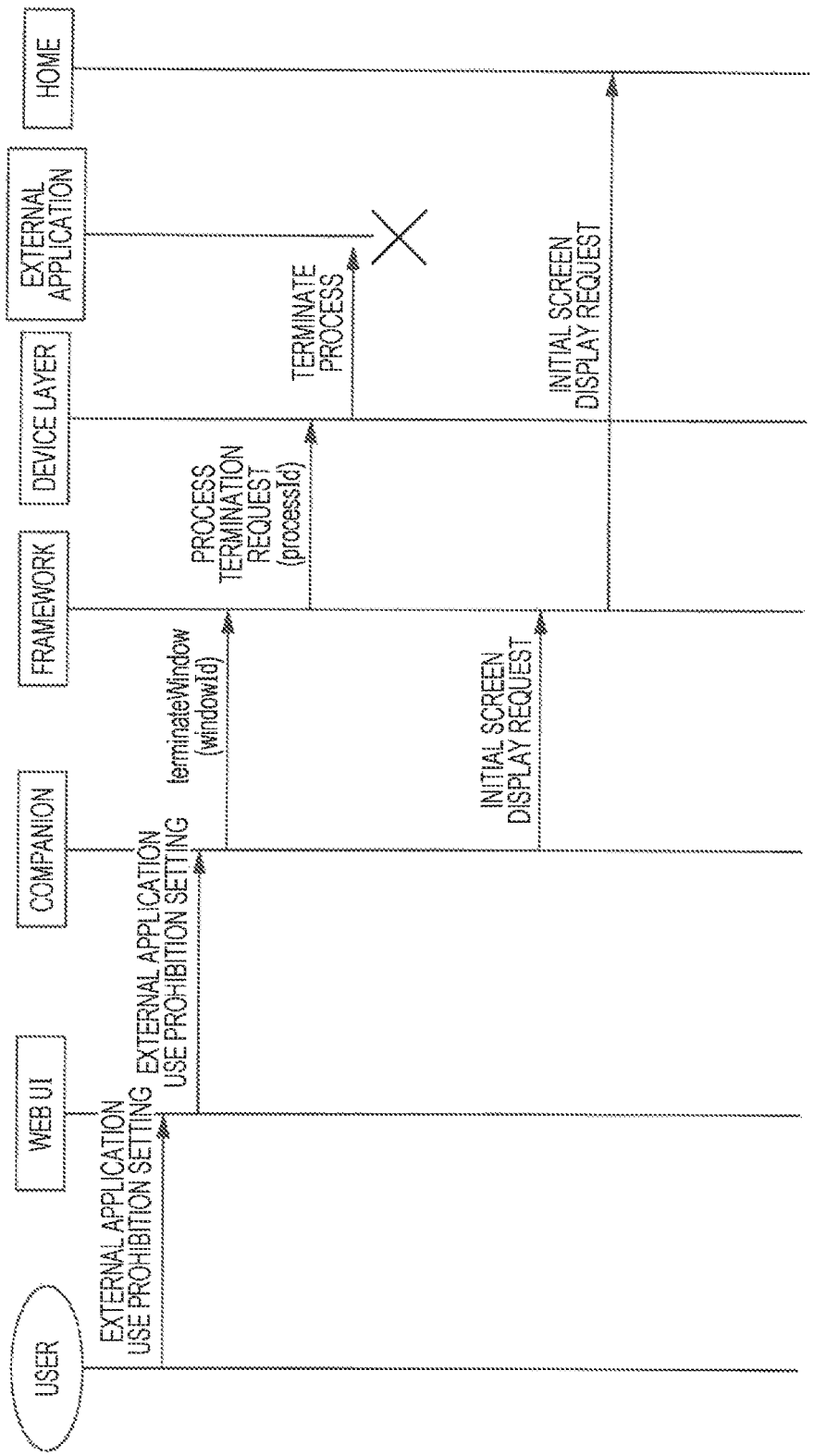
FIG. 26 is a sequence diagram at termination of the external application from the outside.

FIG. 26 is a sequence diagram in case of termination from the outside. In other words, FIG. 26 is a sequence diagram when the user makes external application use prohibition setting from Web UI of the image processing apparatus.

The user makes setting for prohibiting use of an external application on the Web UI. The Web UI notifies the device service layer 32 about the external application use prohibition setting.

When the event detecting unit 745 of the companion application 74 receives the notification that the external application use setting is prohibited from the device service layer 32, the event detecting unit 745 instructs the external application process managing unit 744 to check whether or not an external application in operation is present. If the external application in operation is present and is being displayed, the event detecting unit 745 issues an initial screen display request to the framework 31, and issues a window terminate event (terminateWindow). The parameter is the window ID.

When the screen controller 312 of the framework 31 receives the window terminate event (terminateWindow) and when the external application is being displayed, the screen controller 312 deletes the displayed window of the layer managing unit 315, and deletes the window information from the window managing unit 314. Also, the screen controller 312 issues the process termination request to the device service layer 32. The device service layer 32 terminates the external application in response to the process terminate request. Further, the application managing unit 316 receives the initial screen display request from the companion application 74, and issues the initial screen display request to the home application 70 as the initial screen activation application. Accordingly, the external application is terminated and the home screen is displayed as the initial screen.

Figure 27:
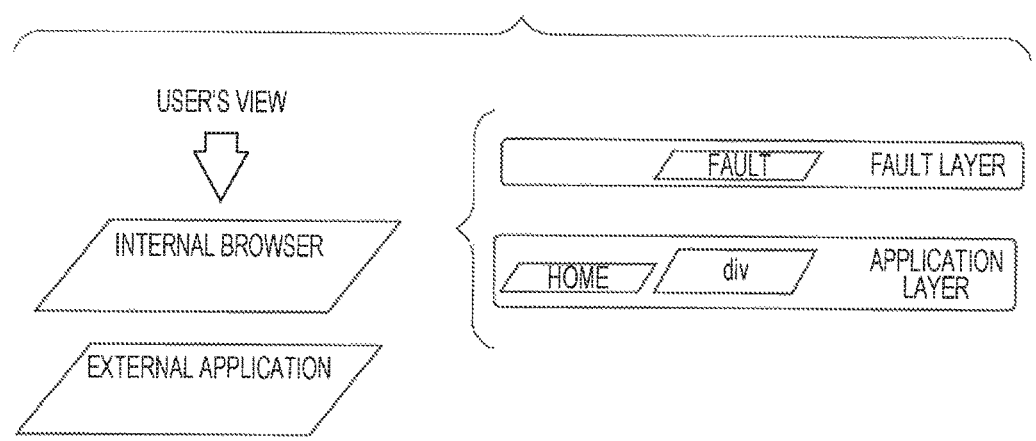
FIG. 27 is an explanatory view of a layer structure of an internal browser and an external application.

FIG. 27 schematically shows a layer structure of a window that is controlled and managed by the companion application 74 and the framework 31.

When the framework 31 receives the external application activation request from the companion application 74, the framework 31 creates the common information and the external window management information as the window management information, and creates the div element as the external window management information for embedment into the internal browser. This div element functions as a dummy or an alias, and is a transparent div element. The framework 31 requests the device service layer 32 to activate the external application. The device service layer 32 non-displays the external application window and arranges the external application window in a layer lower than the layer of the internal browser. The internal browser is managed in the order of the application layer, the popup layer, the banner layer, the alert (low level) layer, the alert (high level) layer, and the fault layer. The figure shows only the application layer and the fault layer for simplifying the figure. The application layer has a div element embedded in the internal browser as a dummy or an alias. The div element is a window only having a transparent frame.

When the framework 31 receives the external application display request from the companion application 74, the framework 31 displays the div element, displays the external application window, and non-displays the internal browser. Accordingly, the user may visually recognize the external application window, and operate the external application. The embedded div element is displayed but is transparent, thereby not affecting the visual recognition by the user. At the same time, since the div element is displayed, the framework 31 may easily recognize that the external application is displayed. The framework 31 handles the external browser as one type of window in addition to the window of the internal application (iframe base), and hence may seamlessly manage the external browser similarly to the internal application. If the fault layer is displayed because a certain abnormality occurs, the framework 31 displays the external application window, displays the internal browser, and displays the fault in the uppermost layer. Accordingly, the fault may be displayed in a manner superimposed on the external application window. A banner may be displayed in a manner similarly to the fault. In this case, "fault" is displayed if an abnormality occurs in a system, and "banner" is displayed if a notification on information relating to a job is made. In general, fault has a higher degree of priority or a higher degree of urgency than the degree of priority or urgency of the banner. Since the function and information to be informed of a banner differ from those of a fault, the banner or the fault may not be selectively displayed and the banner and the fault may be displayed in a superimposed manner.

When a banner is displayed in a superimposed manner on an external application window, the external application window arranged in the layer below the banner layer and corresponding to the banner displayed area is hidden and not shown. The system other than the banner display area is not abnormal and the external application window may be shown and the external application may be necessary to be operated. In this situation, the dummy transparent div element for managing the external application window is present in the application layer as described above. Accordingly, the external application window other than the banner display area may be visually recognizable through the transparent div element.

Figure 28A:
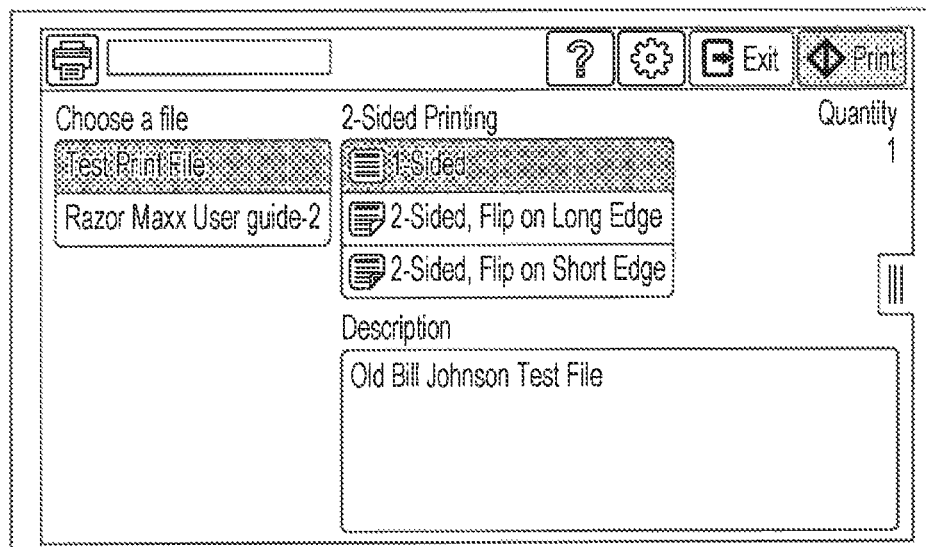
FIGS. 28A and 28B are explanatory views of a superimposed display state of an external application and a banner.

FIG. 28A shows a state in which an external application is activated and an external application window is displayed.

Figure 28B:
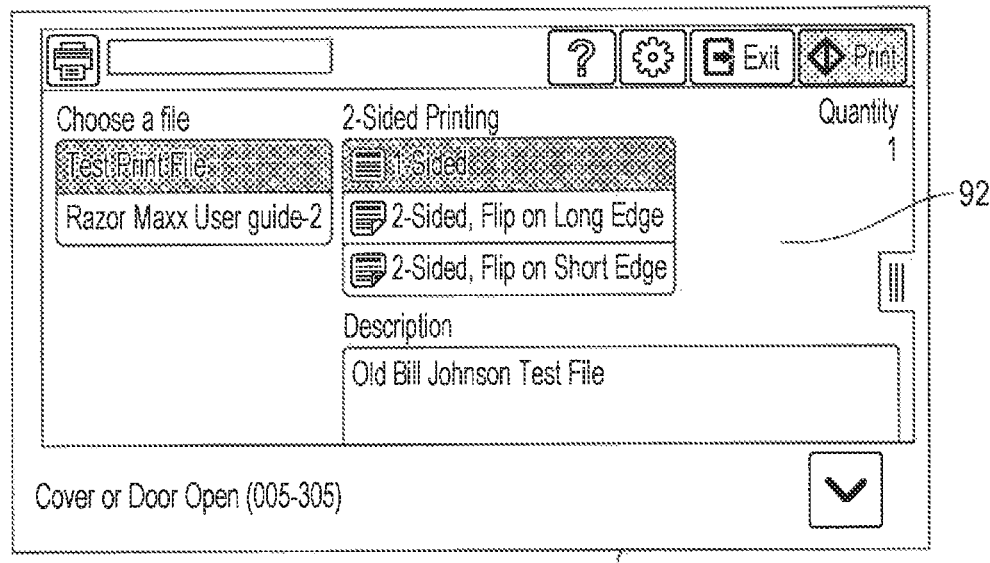

FIG. 28B shows a state in which a banner is displayed in a superimposed manner on the external application window.

In FIG. 28A, the internal browser is non-displayed, the external application window is displayed, and hence the user may visually recognize the external application. Although the internal browser is non-displayed, the dummy transparent div element is displayed. In this state, if a certain abnormality occurs, for example, a cover or a door of the image processing apparatus is open, the screen controller 312 of the framework 31 displays a banner 90 in a superimposed manner on the external application window at a predetermined position of the screen, for example, in a lower portion of the screen. The portion of the external application window under the display area of the banner 90 is hidden and not shown. However, since the transparent div element is present in the area other than the display area of the banner 90, an external application window 92 is shown. When the user operates the external application in the area where the external application window 92 is shown other than the display area of the banner 90, the user operates the transparent div element in terms of the logical configuration. The event detecting unit 745 of the framework 31 detects the operation on the div element by the user and notifies the device service layer 32 about the event caused by the operation, and the device service layer 32 notifies the external application about the operation event. As described above, even when a layer higher than the layer of the external application window is displayed, the external application may be operated as long as the transparent div element is arranged therebetween. That is, the transparent div element as a dummy has the function of seamlessly managing and controlling the internal application window and the external application window, and the function of allowing the external application to be operated in an area not hidden by a banner in a case where the banner is displayed in a superimposed manner on the external application.

A "component" in this exemplary embodiment represents a component of software that may be logically separated. A component may be executed by one or plural processors. In this exemplary embodiment, JavaScript is used. However, of course, any one of other programming languages may be used.

Also, the present invention is not limited to the above-described exemplary embodiment, and may be modified in various ways. Modifications are described below.

First Modification

In the exemplary embodiment, the controller (processor) 22 of the image processing apparatus 12 executes the framework 31 and the various applications 50 in the presentation layer 30. However, since the presentation layer 30 and the device service layer 32 are separated from one another as shown in FIG. 2, an individual apparatus different from the image processing apparatus 12, for example, a processor in a mobile terminal, such as a smart phone or a tablet terminal, for controlling the image processing apparatus 12 may execute the framework 31 and the various applications 50 in the presentation layer 30. Also, the operation unit 26 in FIG. 1 is desirably mounted on the mobile terminal. In this case, the mobile terminal and the image processing apparatus 12 may be collectively called image processing apparatus or image processing system.

Second Modification

In the exemplary embodiment, while the fault and the banner are exemplarily described, the examples are not limited to the fault and the banner. Any of all windows to be displayed in a layer higher than the application layer may be applied if the window satisfies a condition that the external application window is viewable through the window as long as the window may hide the external application window and the window is semi-transparent.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an application on a framework that is separated into a core logic portion handling basic processing and a user interface frame portion handling rendering processing;
   a controller that executes the application and the framework;
   an external application; and
   a companion application arranged between the framework and the external application,
   wherein the core logic portion is implemented with an application programming interface defined by the framework, and publishes a method and an event that are used for communication with a core logic portion of another application;
   wherein the companion application instructs the framework to activate the external application in response to an instruction from a user; and
   wherein the framework activates the external application in response to the instruction to activate the external application from the companion application and arranges and displays a window of the external application in a layer lower than a layer of a window of the application on the framework.

2. The image processing apparatus according to claim 1, wherein the core logic portion of the application on the framework stops the publication of the method and event.

3. The image processing apparatus according to claim 1, wherein the core logic portion of the application on the framework executes at least one of call of the published method, registration of a listener of the published event, and firing of the event.

4. The image processing apparatus according to claim 1, wherein the framework arranges the window of the external application in the layer lower than the layer of the window of the application on the framework and non-displays the window of the external application in response to the instruction of activating the external application, and the framework non-displays the window of the application on the framework in response to an instruction of displaying the external application from the companion application and displays the window of the external application.

5. The image processing apparatus according to claim 4, wherein the framework displays the window of the application on the framework in response to the instruction of displaying the external application from the companion application if a banner or a fault is displayed.

6. The image processing apparatus according to claim 1, wherein the framework embeds a dummy management element for managing the window of the external application into the window of the application on the framework in response to the instruction of activating the external application, displays the window of the external application, and displays the dummy management element in a transparent manner.

7. The image processing apparatus according to claim 6, wherein the framework operates the external application while recognizing an operation on the dummy management element displayed in the transparent manner, as an operation on the external application.

8. The image processing apparatus according to claim 1, wherein the framework instructs the companion application to terminate the external application in response to an instruction of terminating the external application from the user,
   wherein the companion application deletes management information on the external application in response to the instruction of terminating the external application, and instructs the framework to display an initial screen, and
   wherein the framework displays the initial screen instead of the external application in response to the instruction of displaying the initial screen.

9. The image processing apparatus according to claim 1, wherein the framework instructs the companion application to terminate the external application if the external application is abnormally terminated,
   wherein the companion application deletes management information on the external application in response to the instruction of terminating the external application, and instructs the framework to display an initial screen, and
   wherein the framework displays the initial screen instead of the external application in response to the instruction of displaying the initial screen.

10. The image processing apparatus according to claim 1, wherein, in a state in which the window of the external application is displayed, when the framework displays an initial screen in response to an operation from the user, the framework non-displays the window of the external application and notifies the companion application about the non-display of the window of the external application, and
    wherein the companion application updates management information on the external application in response to the notification about the non-display of the window of the external application.

11. A non-transitory computer readable medium storing a program causing a processor that controls an image processing apparatus to execute a process for image processing, the process comprising:
    implementing an application separated into a core logic portion handling basic processing and a user interface frame portion handling rendering processing;
    implementing an application programming interface defined by a framework in the core logic portion, loading the core logic portion by the framework at activation of a system, and publishing a method and an event that are used for communication with a core logic portion of another application;
    activating an external application in response to an instruction from a companion application arranged between the framework and the external application, the instruction from the companion application being in response to an instruction from a user; and arranging and displaying a window of the external application in a layer lower than a layer of a window of the application on the framework.

\* \* \* \* \*